(12) United States Patent
Evans

(10) Patent No.: US 6,663,131 B2
(45) Date of Patent: Dec. 16, 2003

(54) DOLLY FOR TOWING DISABLED TRAILERS

(76) Inventor: Fraser Evans, 2035 Fletcher Road, Binbrook, Ontario (CA), L0R 1C0

(*) Notice: Subject to any disclaimer, the term of this patent is extended or adjusted under 35 U.S.C. 154(b) by 136 days.

(21) Appl. No.: 10/051,801

(22) Filed: Jan. 17, 2002

(65) Prior Publication Data

US 2003/0132604 A1 Jul. 17, 2003

(51) Int. Cl.[7] .............................. B62D 33/06; B60D 1/52
(52) U.S. Cl. .............................. 280/476.1; 280/425.1; 280/438.1
(58) Field of Search .................. 280/438.1, 476.1, 280/477, 425.1, 441

(56) References Cited

U.S. PATENT DOCUMENTS

| | | |
|---|---|---|
| 2,733,931 A | 2/1956 | Reid et al. |
| 3,004,772 A | 10/1961 | Bohlen |
| 3,061,332 A | 10/1962 | Goulden |
| RE26,303 E | 11/1967 | Chew |
| 3,476,405 A | 11/1969 | Cunha |
| 3,486,768 A | 12/1969 | Masser |
| 3,567,252 A | 3/1971 | Zubko |
| 3,717,363 A | 2/1973 | Berends |
| 3,797,863 A | 3/1974 | Cunha |
| 3,995,876 A | 12/1976 | Ronne |
| 4,081,090 A | 3/1978 | Hopkins |
| 4,456,278 A | 6/1984 | Chapman |
| 4,493,491 A | 1/1985 | Karlik |
| 4,618,161 A | 10/1986 | McNeill |
| 4,650,205 A | 3/1987 | Jarlsson |
| 4,712,967 A | 12/1987 | Farthing |
| 5,090,720 A | 2/1992 | Heider et al. |
| 5,348,332 A | 9/1994 | Hamilton |
| 5,924,716 A * | 7/1999 | Burkhart, Sr. et al. ... 280/476.1 |
| 6,565,108 B1 * | 5/2003 | Gearhart .................. 280/476.1 |

* cited by examiner

Primary Examiner—Lesley D. Morris
Assistant Examiner—Matthew Luby
(74) Attorney, Agent, or Firm—Young & Basile P.C.

(57) ABSTRACT

A dolly is disclosed and includes a pair of wheels; a frame mounted to the wheels and movable to an engagement position beneath the forward end of a trailer; a fifth wheel assembly; a mounting assembly and a clamp system. The fifth wheel assembly includes a track and a fifth wheel mounted thereto for movement parallel to a translation axis defined by the track. The mounting assembly connects the fifth wheel assembly to the frame for movement between a raised position, whereat the fifth wheel is positioned to receive the trailer kingpin upon movement of the frame to the engagement position, and a lowered position, whereat the forward end of the trailer is supported on the frame. The clamp system is mounted to the frame and selectively locks same against rotation relative to the trailer, to permit the trailer to be towed from its rearward end.

18 Claims, 24 Drawing Sheets

222

222

PRIOR ART

DOLLY FOR TOWING DISABLED TRAILERS

FIELD OF THE INVENTION

The present invention relates to the field of vehicular towing, and more particularly, to a dolly for towing disabled trailers, more particularly, disabled semi-trailers.

BACKGROUND OF THE INVENTION

In the trucking industry, it is not uncommon to encounter a disabled trailer, that is, a trailer which has suffered damage to its structure, suspension components or wheels such that it cannot be safely towed in the conventional manner by a tractor. Such a situation can occur as a result of, inter alia, a vehicular collision, lack of proper maintenance or prolonged periods of non-use.

In order to move trailers so disabled, it is known to cut same into small transportable scrap pieces. However, this method is time-consuming and requires specialized tools and lifting equipment, and as such, is not well-suited for use at accident scenes, where relatively expeditious removal is required. (This method is also relatively expensive.) One method used in the past to provide for such relatively expeditious removal encompasses the steps of connecting a conventional trailer dolly to the kingpin located at the front of the trailer; locking the trailer dolly into longitudinal alignment with the trailer by chains and/or straps; and using a tow truck to tow the trailer, by engagement with its back end. However, this method suffers, to the extent that it can be difficult to ensure that the trailer dolly is locked securely and correctly into longitudinal alignment with the trailer.

Trailer dollies have been developed in the past which include means for locking the trailer dolly into longitudinal alignment with a trailer. Examples can been seen in U.S. Pat. No. 4,252,336 issued Feb. 24, 1981 to R. Hubbard, and U.S. Pat. No. 3,476,405 issued Nov. 4, 1969 to J. Cunha. However, in each of these systems, it is required that the trailer be specifically adapted for use with the dolly (the Hubbard trailer turntable locking apparatus can be used only with trailers having longitudinal frame struts spaced apart a predetermined distance; the Cunha detachable running gear can be attached in longitudinal alignment only with trailers that are especially adapted to receive the running gear) and they thus lack general usefulness in association with the wide variety of trailers now in use, such as van trailers, frameless dump trailers, tank trailers and frame trailers, which do not include such special adaptations.

SUMMARY OF THE INVENTION

The invention includes a dolly for use with a truck trailer of the type having a forward end, a rearward end, a pair of spaced-apart sides each extending between the forward end and the rearward end and a kingpin depending downwardy from the underside of the forward end.

According to one aspect of the invention, the dolly comprises a pair of ground-engaging wheels defining a rotation axis. A frame is mounted to the wheels and movable during use of the dolly to an engagement position beneath the forward end of the trailer, the frame defining a longitudinal axis that is perpendicular to the rotation axis. A fifth wheel assembly including a track defining a translation axis that is substantially parallel to the longitudinal axis and further including a fifth wheel for connection with the kingpin of the trailer and mounted to the track for selective movement parallel to the translation axis is also provided, as is a mounting assembly. The mounting assembly connects the fifth wheel assembly to the frame for selective, reversible movement from a raised position, whereat the fifth wheel is positioned so as to receive the kingpin of the trailer upon movement of the frame to the engagement position and to support the forward end of the trailer, to a lowered position, during which movement the forward end of the trailer is lowered to a towing position, whereat the forward end is supported on the frame for rolling movement therewith. Also provided is a clamp system mounted to the frame for selectively, releasably locking the frame, when the forward end of the trailer is at the towing position, as against rotation relative to the trailer about the kingpin, so as to permit the trailer to be towed from the rearward end thereof.

According to another aspect of the invention, the dolly comprises a pair of ground-engaging wheels defining a rotation axis and a frame mounted to the wheels, the frame being movable during use of the dolly to an engagement position beneath the forward end of the trailer. The frame defines a longitudinal axis that is perpendicular to the rotation axis. A fifth wheel assembly including a fifth wheel for connection with the kingpin of the trailer is provided, and mounted to the frame for selective, reversible movement from a raised position, whereat the fifth wheel is positioned so as to receive the kingpin of the trailer upon movement of the frame to the engagement position and to support the forward end of the trailer, to a lowered position, during which movement the forward end of the trailer is lowered to a towing position, whereat the forward end is supported on the frame for rolling movement therewith. A clamp system is also provided, and includes a pair of longitudinally-spaced clamp assemblies including a first clamp assembly and a second clamp assembly. Each clamp assembly includes a pair of laterally-spaced gripping members mounted to the frame for selective lateral movement between a locked position, whereat the gripping members are disposed relatively closer to one another in a position suitable to grip the forward end of the trailer when at the towing position, thereby to lock the frame as against rotation relative to the trailer about the kingpin and permit the trailer to be towed from the rearward end thereof, and an unlocked position, whereat the gripping members are disposed relatively further apart from one another in a position suitable to receive therebetween in spaced relation the forward end of the trailer.

According to yet another aspect of the invention, the dolly comprises a pair of ground-engaging wheels defining a rotation axis and a frame mounted to the wheels and movable during use of the dolly to an engagement position beneath the forward end of the trailer, the frame defining a longitudinal axis that is perpendicular to the rotation axis. A fifth wheel assembly including a fifth wheel for connection with the kingpin of the trailer is provided, and is mounted to the frame for selective, reversible movement from a raised position, whereat the fifth wheel is positioned so as to receive the kingpin of the trailer upon movement of the frame to the engagement position and to support the forward end of the trailer, to a lowered position, during which movement of the track the forward end of the trailer is lowered to a towing position, whereat the forward end is supported on the frame for rolling movement therewith. Also provided is a clamp system including a clamp assembly. The clamp assembly includes a pair of laterally-spaced gripping members positionable in an unlocked position, whereat the gripping members are disposed relatively further apart from one another in a position suitable to receive therebetween in spaced relation the forward end of the trailer. The gripping members are mounted to the frame for selective, reversible, linked, lateral movement towards one another at equal rates to a locked position whereat the gripping members are disposed relatively closer to one another in a position suitable to grip the forward end of said trailer when at the towing position, thereby to lock the frame as against rotation relative to the trailer about the kingpin and permit the trailer to be towed from the rearward end thereof.

Other advantages, features and characteristics of the present invention, as well as methods of operation and functions of the related elements of the structure, will become more apparent upon consideration of the following description with reference to the accompanying drawings, the latter of which being briefly described hereinbelow.

DETAILED DESCRIPTION OF THE PREFERRED EMBODIMENT

Figure 5:
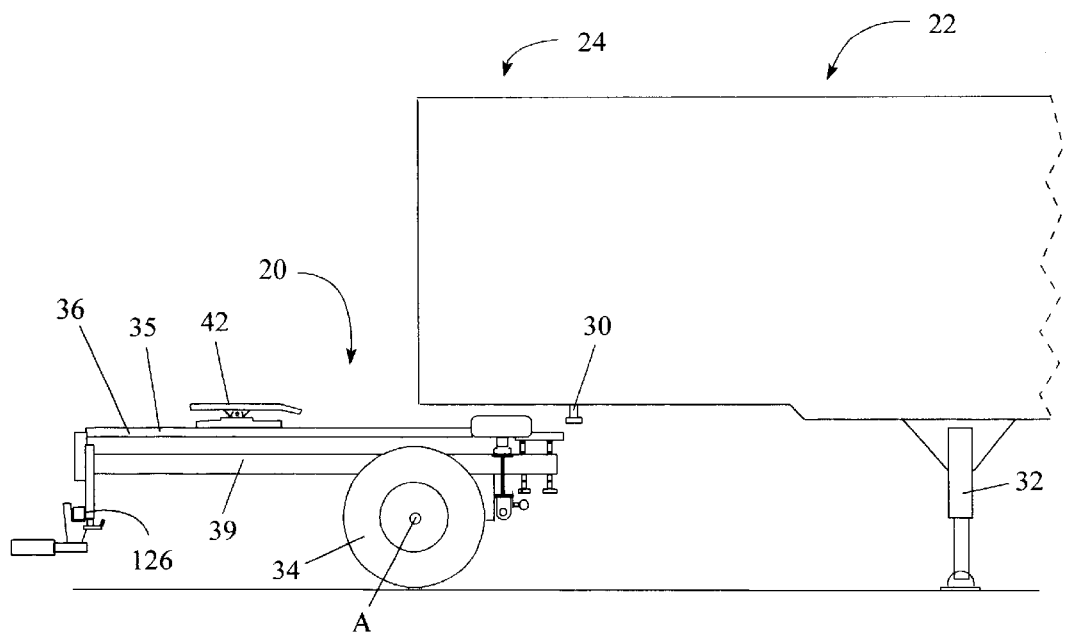
FIG. 5 is a side view of the dolly of FIG. 1 adjacent to a parked van trailer.
Figure 8:
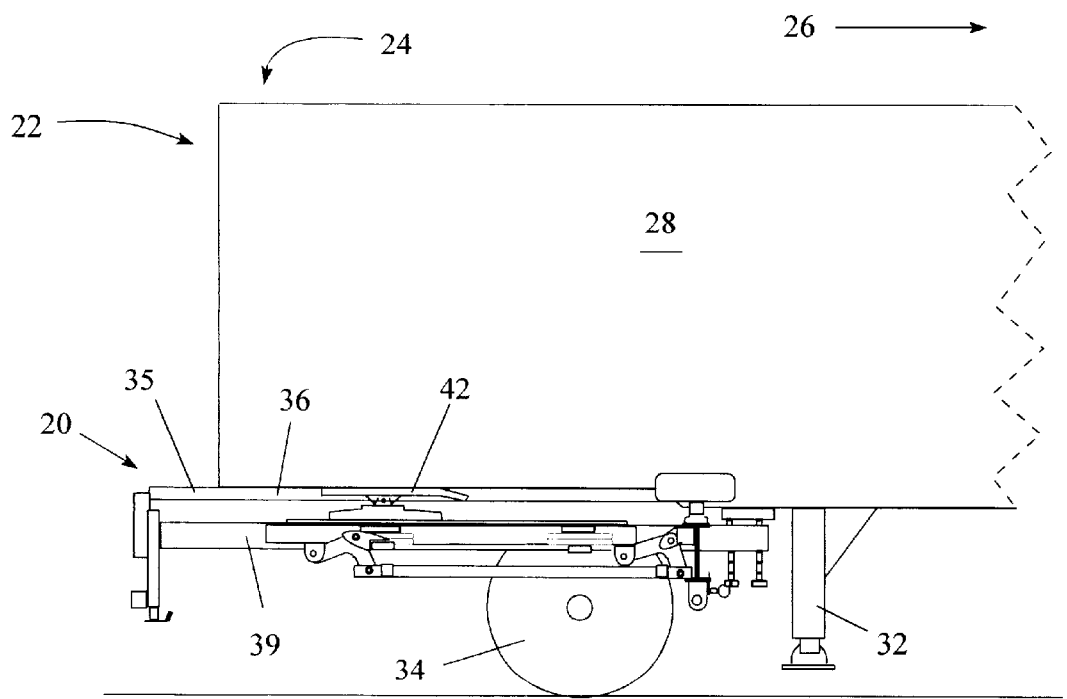
FIG. 8 is a view similar to FIG. 7, with the fifth wheel lowered.
Figure 9:
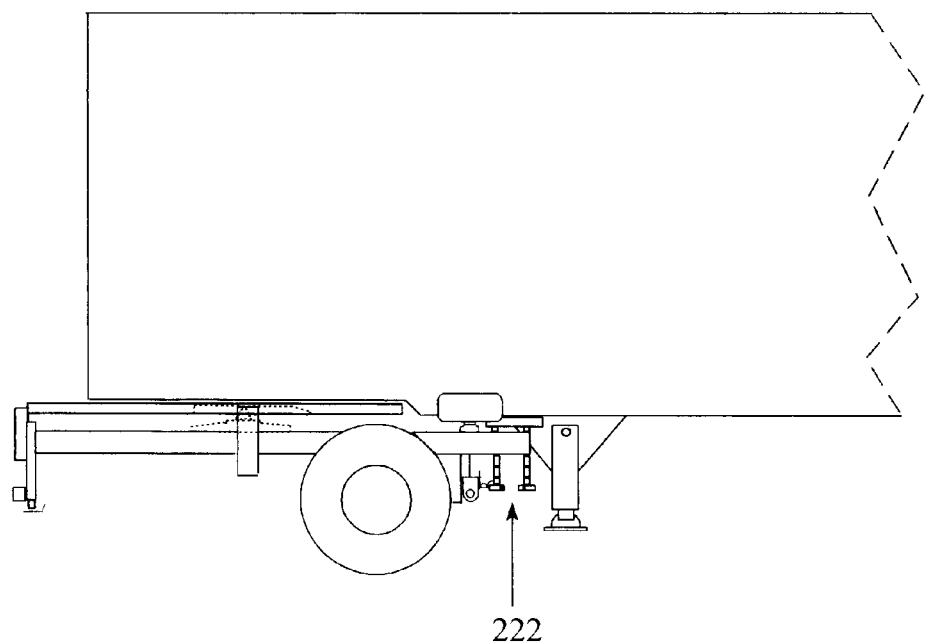
FIG. 9 is a side view similar to FIG. 8.
Figure 10:
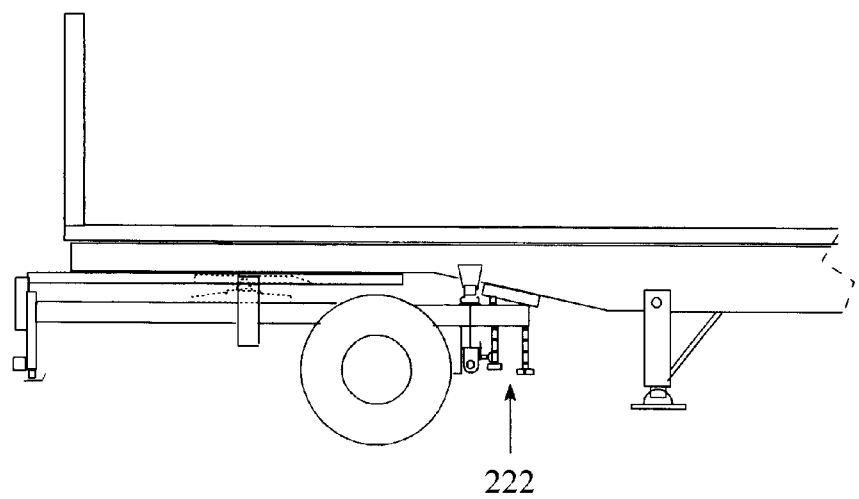
FIG. 10 is a side view similar to FIG. 9, but showing the dolly engaged to a frame trailer.
Figure 11:
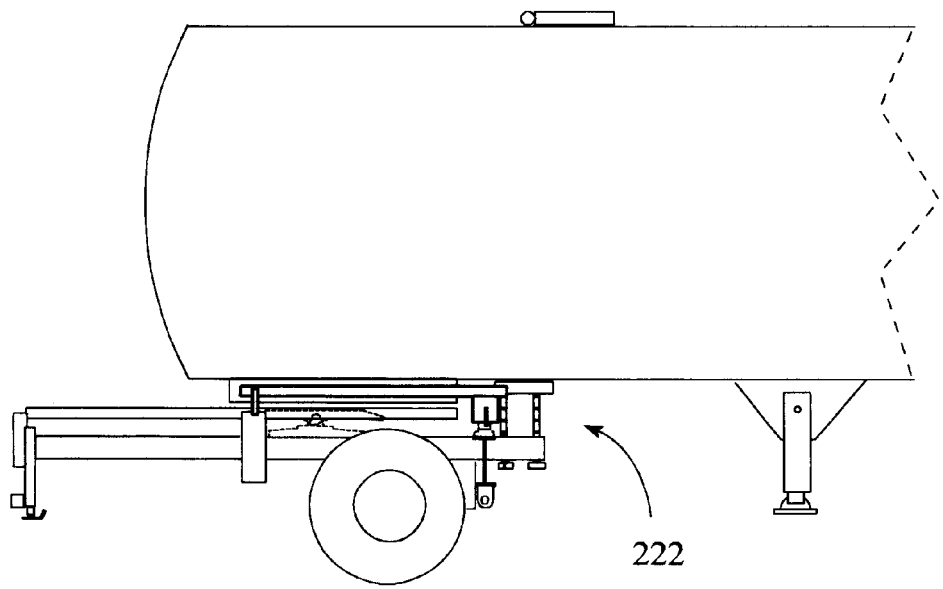
FIG. 11 is a side view similar to FIG. 9, but showing the dolly engaged to a tank trailer.
Figure 12:
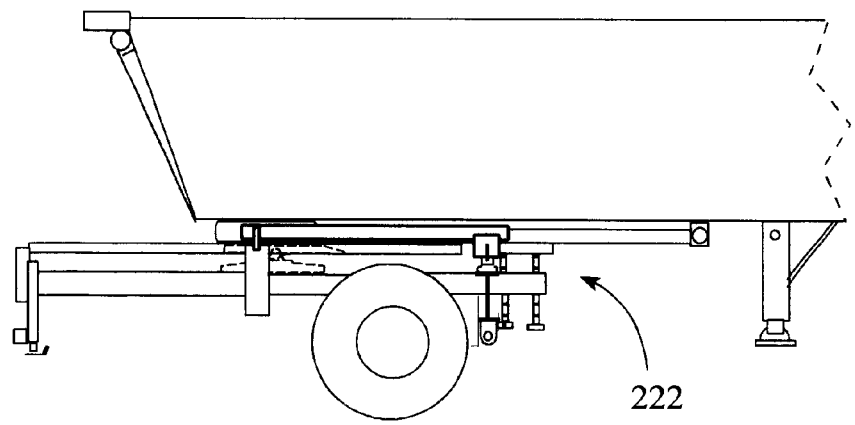
FIG. 12 is a side view similar to FIG. 9, but showing the dolly engaged to a frameless dump trailer.

With general reference to FIG. 8, a dolly 20 according to a preferred embodiment of the present invention is illustrated in use with a disabled trailer 22. The disabled trailer 22 is of conventional construction having a forward end 24, a rearward end 26, a pair of spaced-apart sides 28 each extending between the forward end 24 and the rearward end 26 and a kingpin 30 (seen best in FIG. 5) depending downwardy from the underside of the forward end 24. The disabled trailer 22 further includes a pair of jackstands 32 depending downwardly from the forward end 24 thereof. In FIG. 8, the jackstands 32 are shown to be elevated above the ground surface, but as is conventional, same are selectively, retractably extendable to support the trailer 22 at a parked position, as shown in FIG. 5. For greater certainty, it should be understood that the disabled trailer 22 does not form part of the invention.

Figure 6:
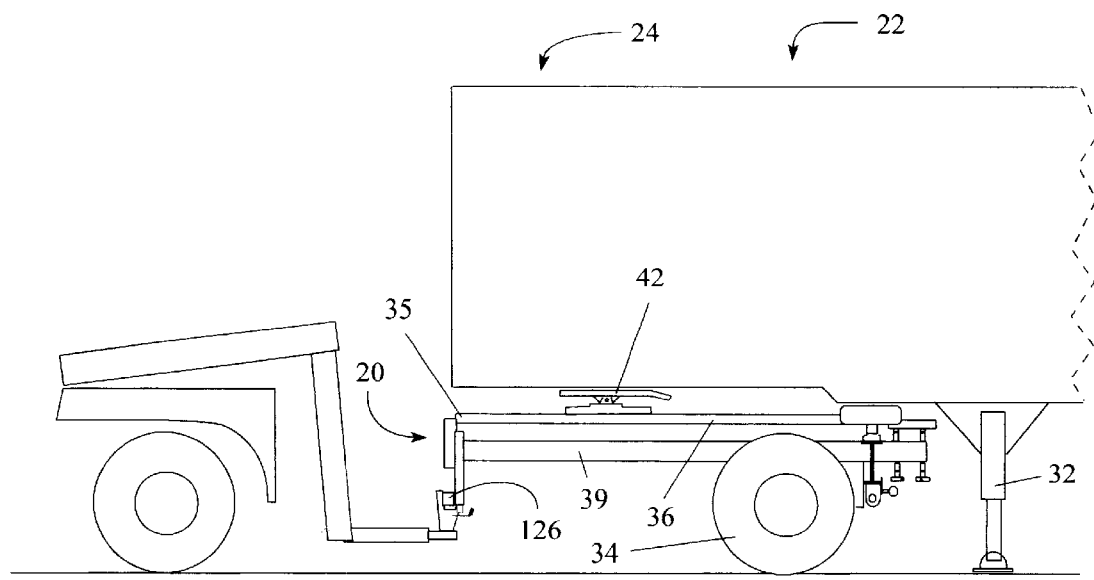
FIG. 6 is a view similar to FIG. 5, showing the dolly disposed beneath the forward end of the trailer with a fifth wheel of the dolly in receipt of the kingpin of the trailer.

The dolly 20 will be seen to comprise a pair of ground-engaging wheels 34 and a frame 35 mounted to the wheels 34 for rolling movement. The frame 35 can be rolled to an engagement position beneath the forward end 24 of the trailer 22 when the trailer 22 is at the parked position, as best indicated in FIG. 5, wherein the dolly 20 is shown apart from a disabled trailer 22 in the parked position, and in FIG. 6, wherein the dolly 20 is shown at the engagement position.

Figure 1:
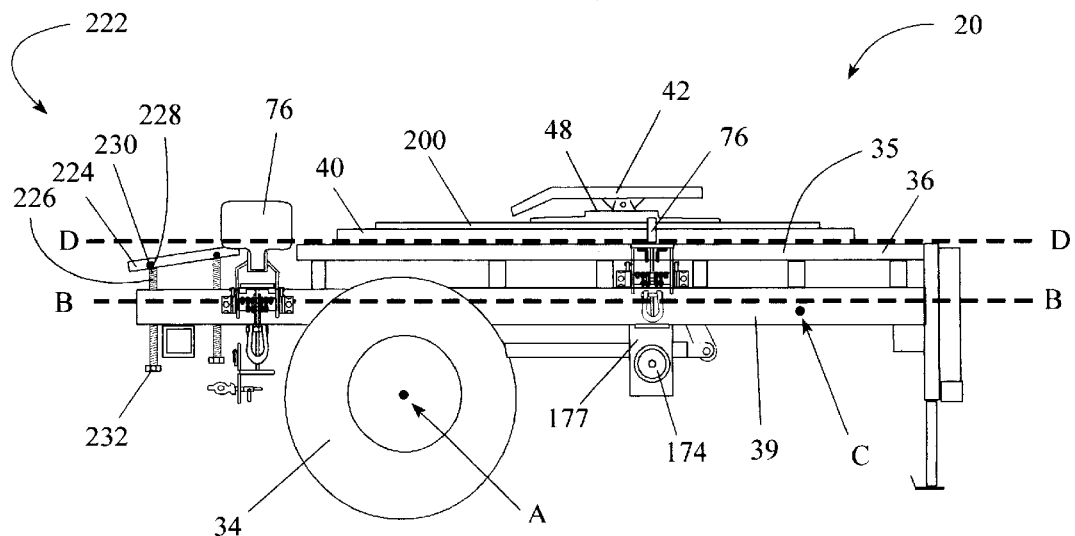
FIG. 1 is a side view of a view of a dolly according to a preferred embodiment of the present invention.
Figure 2:
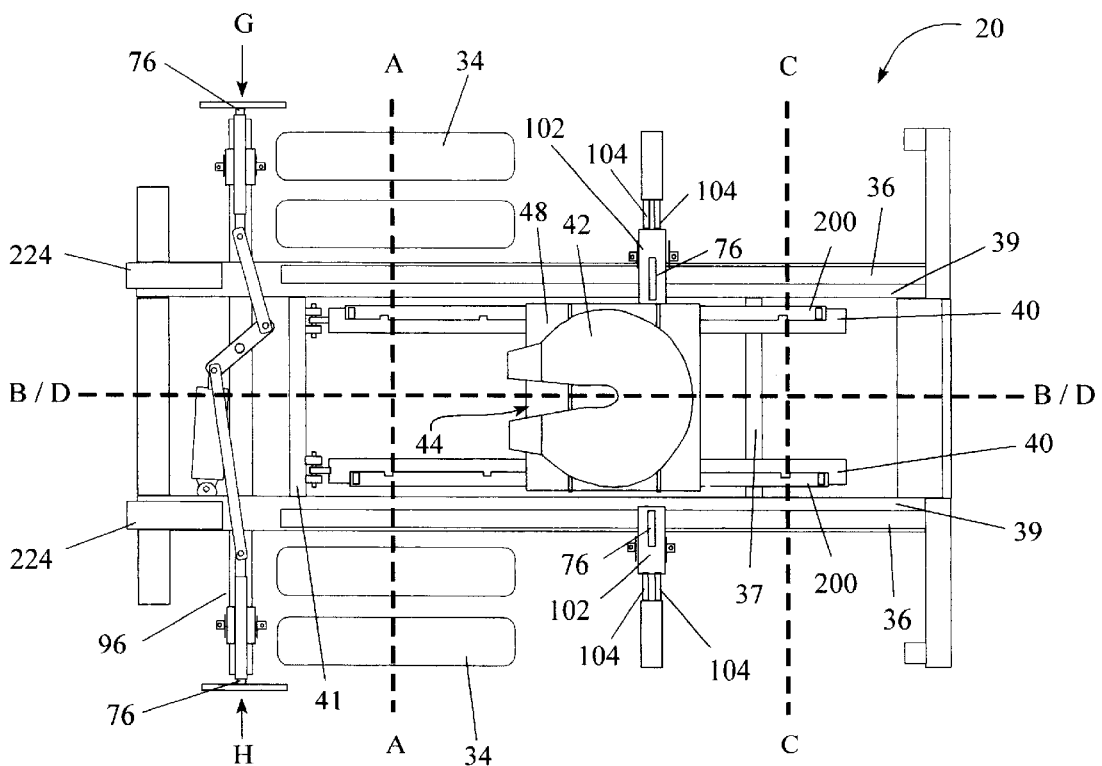
FIG. 2 is a top plan view of the dolly of FIG. 1.

For purpose of description which follows, it should be understood that the wheels 34 define a rotation axis A, and the frame defines a longitudinal axis B and a lateral axis C, the lateral axis C being arranged transverse to the longitudinal axis B and parallel to the rotation axis A, as shown in FIG. 1 and FIG. 2. Also, for improving clarity in the following description, portions of the frame 35 have been specified, namely, upper beams 36, lower beams 39 and crossbeams 37, 41, but it will be understood that the invention is not limited to frames as illustrated and described herein.

Figure 34:
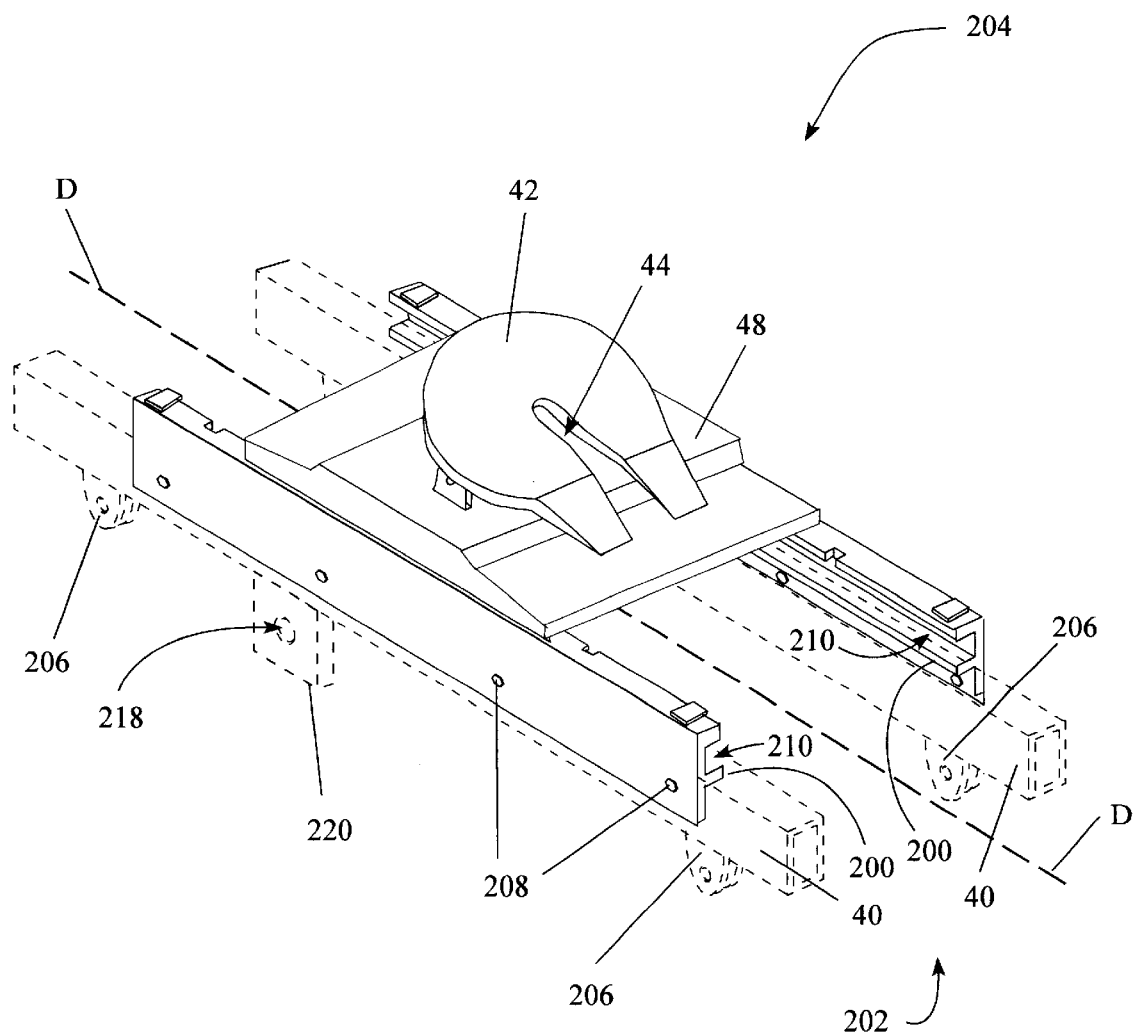
FIG. 34 is a perspective view of a sliding fifth wheel assembly with portions shown in phantom outline, for clarity.
Figure 35:
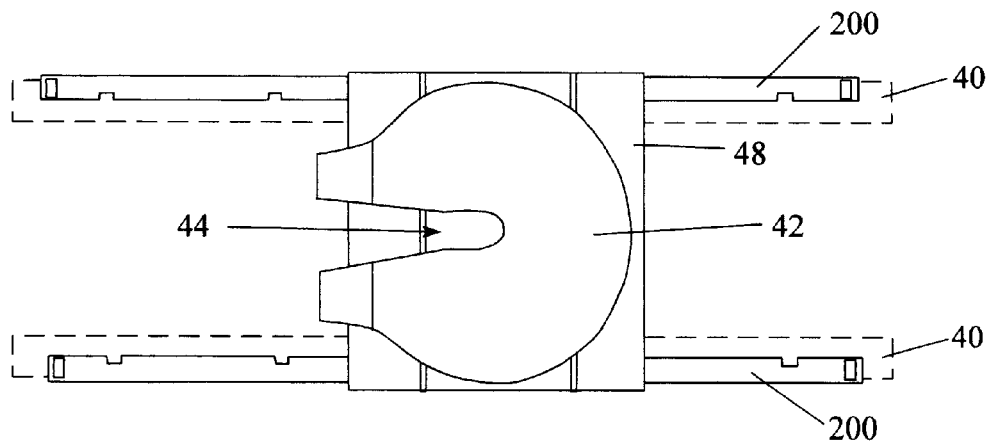
FIG. 35 is a top view of the structure of FIG. 34.
Figure 36:
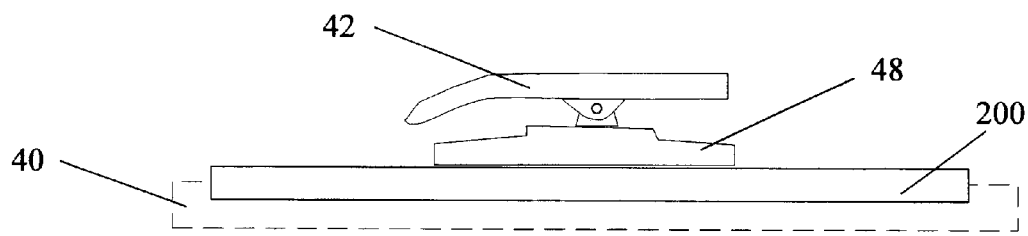
FIG. 36 is a left side view of the structure of FIG. 34.
Figure 37:
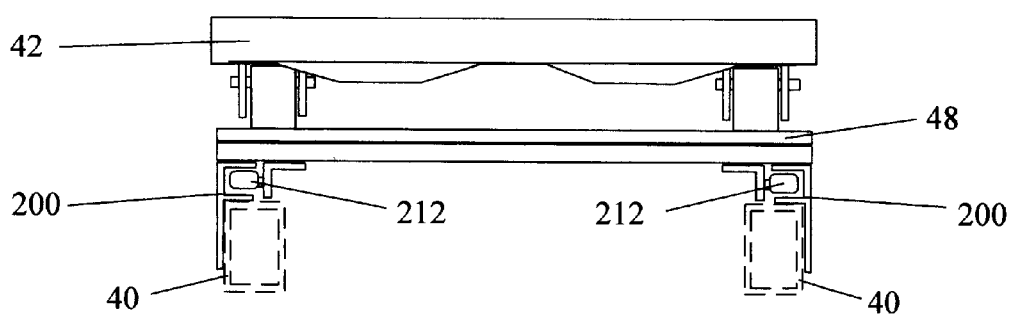
FIG. 37 is a rear end view of the structure of FIG. 34.
Figure 38:
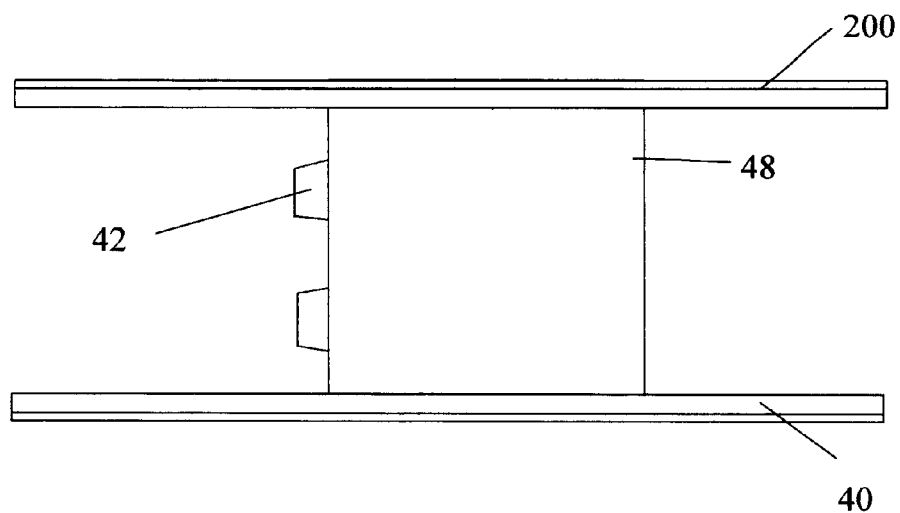
FIG. 38 is a bottom view of the structure of FIG. 34.
Figure 39:
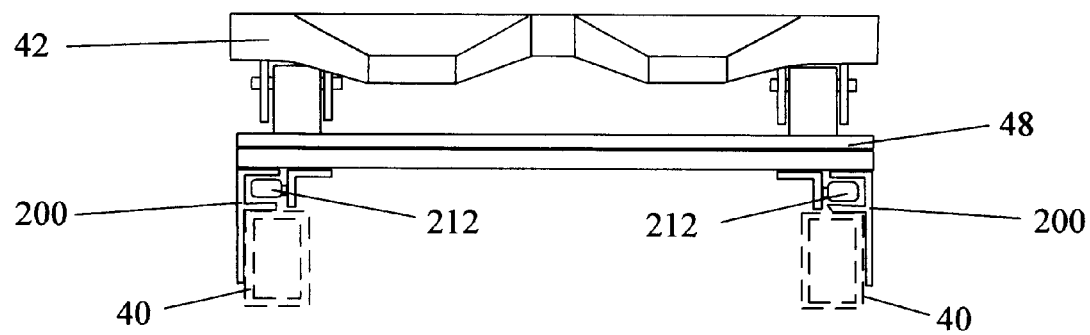
FIG. 39 is a front end view of the structure of FIG. 34.

A sliding fifth wheel assembly 204 is also provided. As best indicated in FIG. 34, the sliding fifth wheel assembly 204 includes a track 202 which defines a translation axis D; a fifth wheel 42 with a keyhole-shaped opening 44 for receiving the kingpin 30 of a trailer 22; and a lock apparatus (not shown) for securing the kingpin 30. The fifth wheel 42 is pivotally mounted to a fifth wheel mount 48 which, in turn, is mounted to the track 202 for selective movement parallel to the translation axis D. FIGS. 34–39 depict a sliding fifth wheel assembly 204 of the prior art. As will be evident, the track 202 is composed of a pair of longitudinally extending beams 40, shown in phantom outline for clarity, to which are attached, by bolts 208, track forming members 200. Track forming members 200 each define a channel 210. As seen in FIGS. 37 and 39, wheels 212 are rotatably mounted on fifth wheel mount 48, and traverse channels 210, thereby to provide for translational movement of fifth wheel mount 48, and the fifth wheel 42 pivotally attached thereto, relative to the track 202. It should be understood that the construction of sliding fifth wheel assemblies is conventional in the art, and the present invention is not limited to the structure described and illustrated herein.

Figure 13:
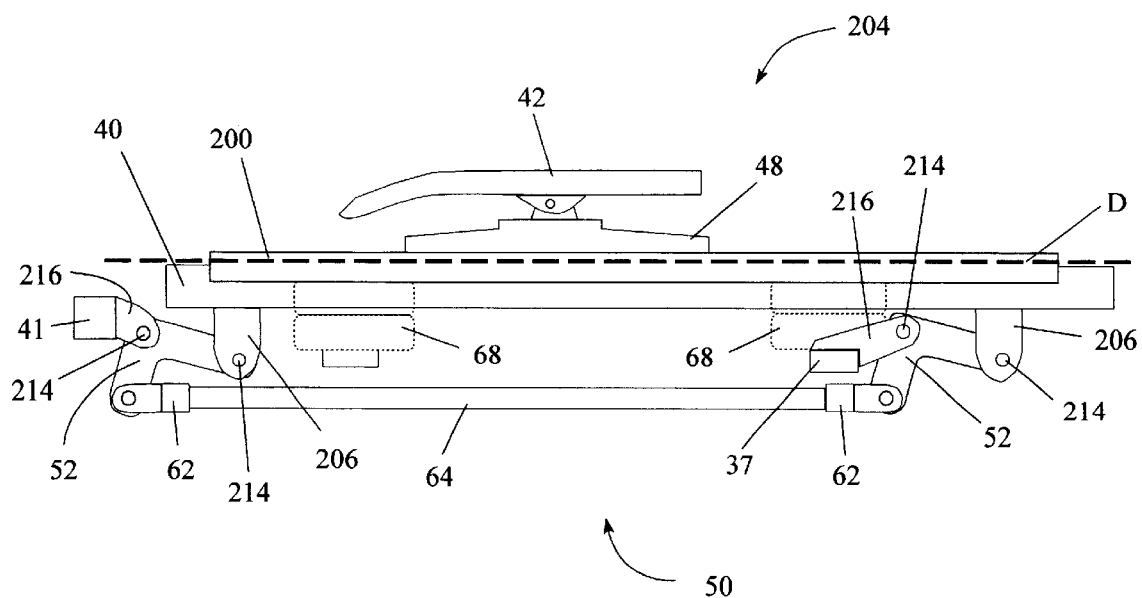
FIG. 13 is a side view of the dolly of FIG. 1, showing the fifth wheel lowered.
Figure 14:
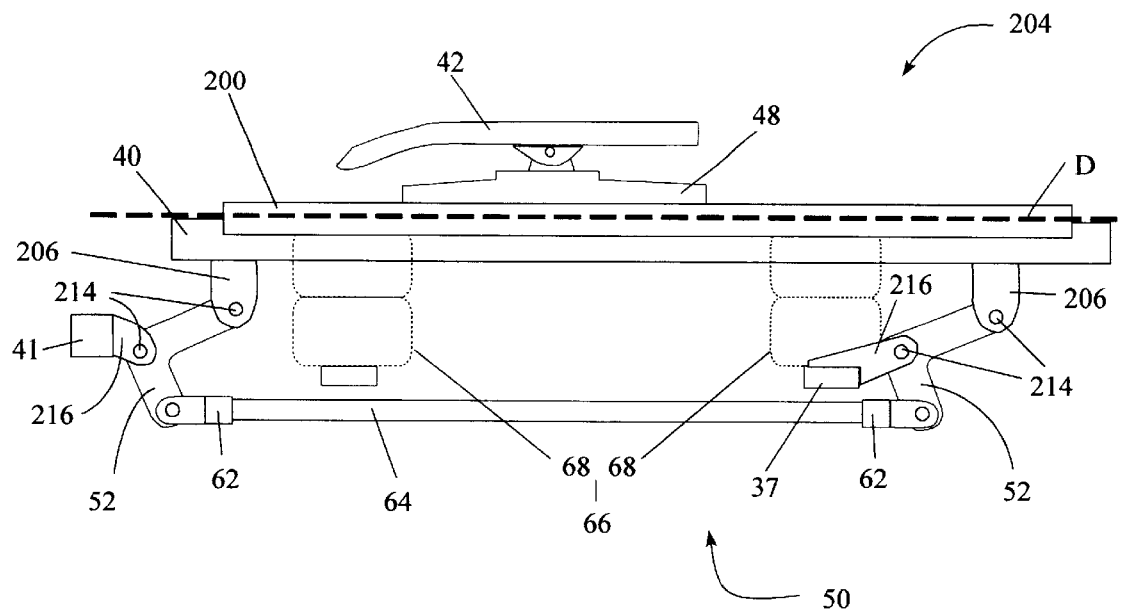
FIG. 14 is a view similar to FIG. 13, showing the fifth wheel raised.

Also provided is a mounting assembly 50 which connects the fifth wheel assembly 204 to the frame 35 for selective, reversible movement from a raised position, shown best in FIG. 14, to a lowered position, shown best in FIG. 13, in a manner such that the orientation of the translation axis D relative to the ground remains constant.

Figure 15:
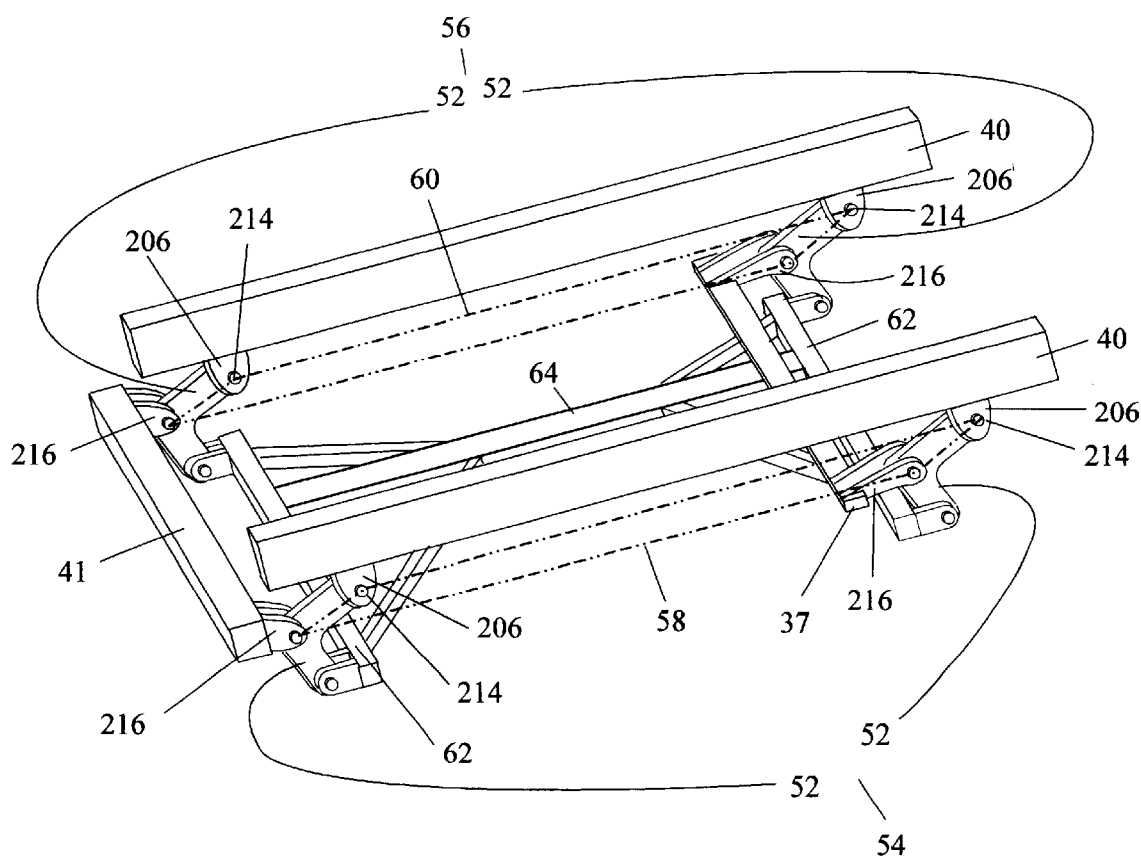
FIG. 15 is a perspective detail view showing features of the construction of a mounting assembly portion of the dolly of FIG. 1.
Figure 40:
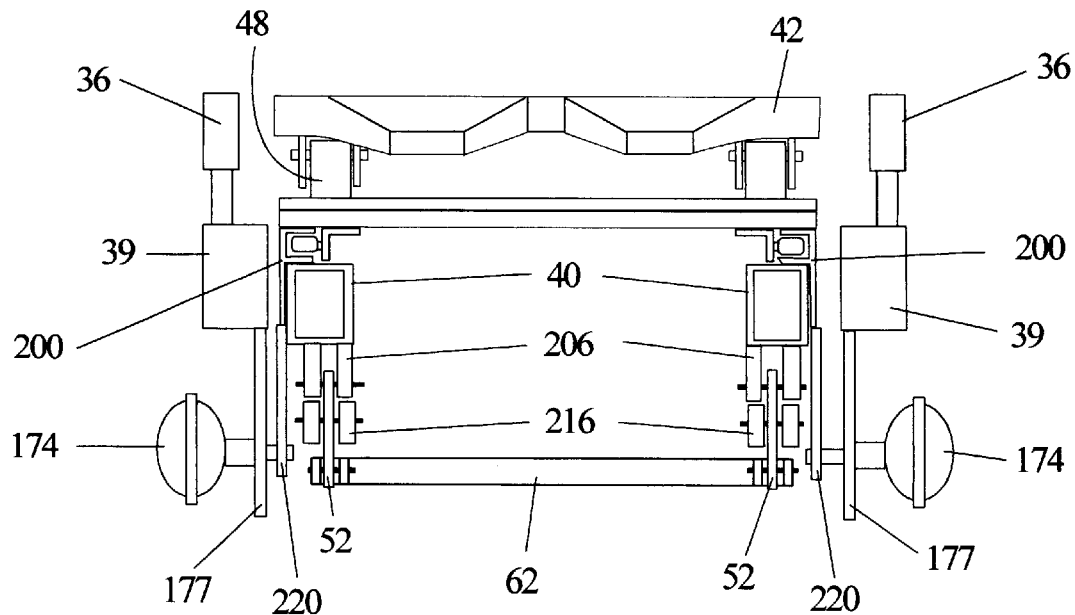
FIG. 40 is a front detail view of the dolly, with the fifth wheel assembly lowered.
Figure 41:
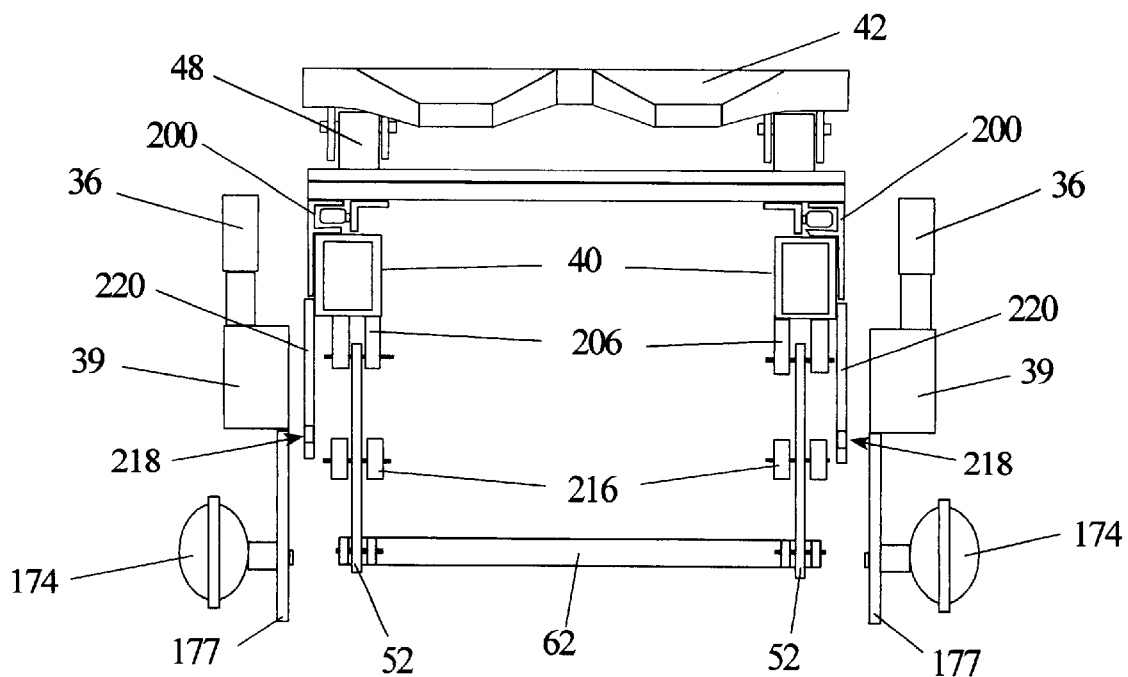
FIG. 41 is a view similar to FIG. 40, with the fifth wheel assembly raised.

The mounting assembly 50 comprises two pairs of longitudinally-spaced mounting links 52, which include two rearward links and two forward links. The four links 52 also form a first pair 54 and a second pair 56 which are laterally spaced apart. As indicated in FIGS. 13–15, which are detail views of the dolly 20 showing, for clarity, only portions of the frame 35 and only portions of the fifth wheel assembly 204, each mounting link 52 extends between and is pivotally connected to each of the track 202 (particularly, a respective beam 40) and the frame 35 (particularly, one of the crossbeams 37,41) such that the first pair of links 54, the frame 35 and the track 202 together define a first 4-bar parallelogram linkage 58 and the second pair of links 56, the frame 35 and the track 202 together define a second 4-bar parallelogram linkage 60. Such pivotal mounting is effected in the preferred embodiment illustrated by lug portions 206 provided on the beams 40 and lug portions 216 provided on the crossbeams 37,41, and pins 214 which couple the links 52 to the frame 35 and to the track 202. A lateral equalizer bar 62 is provided for each of the mounting links 52 of the first pair 54 and extends therefrom and connects to a respective one of the mounting links 52 of the second pair 56. A longitudinal equalizer bar 64 extends between and connects the lateral equalizer bars 62,62. An air bag assembly 66, consisting of two air bag devices 68, is mounted between and to the frame 35 and the track 202, particularly, the beam 40, for selectively effecting movement of the fifth wheel assembly 204 between the raised position and the lowered position. As illustrated in FIGS. 40 and 41, which are, respectively, front detail views of the dolly 20 with the fifth wheel assembly 204 at the lowered and raised position, two lockdown pins 174 are also provided. The lockdown pins 174 extend through the frame 35, particularly, to flanges 177 which rigidly depend from lower beams 39, and are mounted thereto for selective extension. Holes 218 are provided in locking lugs 220 which are rigidly mounted to the beams 40. The holes 218 are aligned with the lockdown pins 174 when the fifth wheel assembly 204 is at the lowered position, to permit extension of the lockdown pins 174 therethrough. In this manner, the fifth wheel assembly 204 may be selectively locked at the lowered position, for general stability and for other reasons which will be made more clear in later paragraphs.

Figure 7:
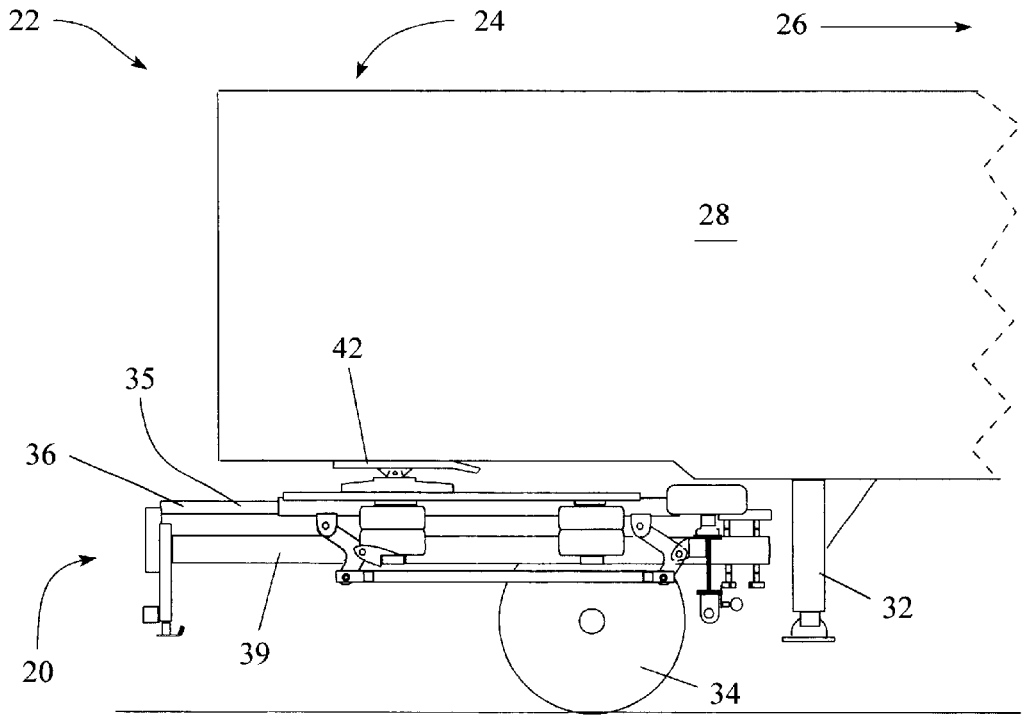
FIG. 7 is a view similar to FIG. 6, with the jackstands of the trailer retracted.

At the raised position, the fifth wheel 42 is positioned so as to receive the kingpin 30 of the trailer 22 upon movement of the frame 35 to the engagement position as aforedescribed. The jackstands 32 of the trailer 22 can then be retracted, as shown in FIG. 7, and the fifth wheel assembly 204 moved to the lowered position. During this movement from the raised to the lowered position, the forward end 24 of the trailer 22 is lowered to a towing position where it is supported on the frame 35, particularly, on upper beams 36, as shown in FIG. 8.

With the forward end 24 of the trailer 22 so positioned (which is the towing position), the dolly 20 can be selectively, releasably locked as against rotation relative to the trailer 22 about the kingpin 30 by a clamp system 70 provided for this purpose.

Figure 25:
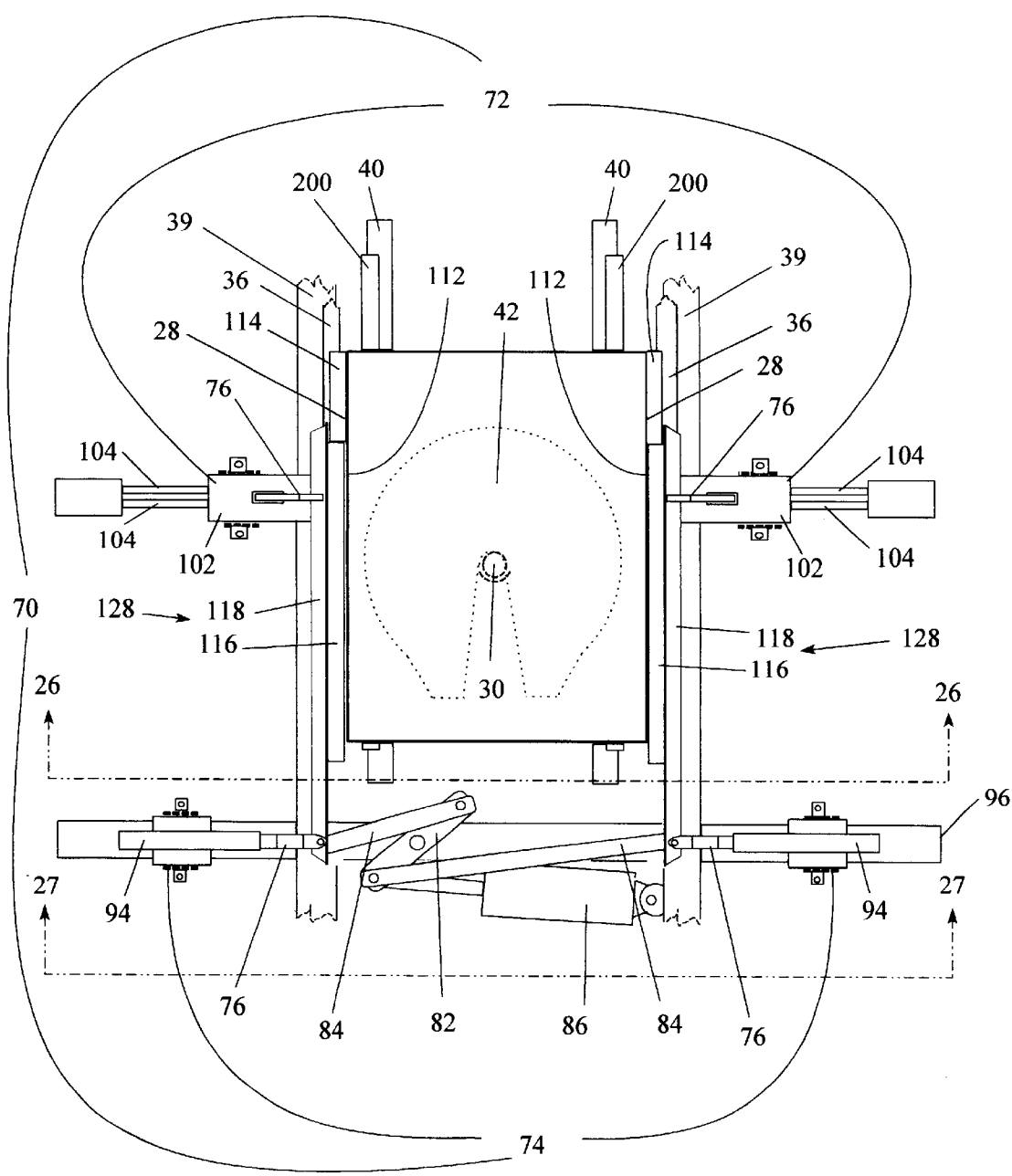
FIG. 25 is a detail top view similar to FIG. 21, showing the first clamp assembly and second clamp assembly in receipt of the undercarriage of a tank trailer.

As indicated in FIG. 25, the clamp system 70 comprises a pair of longitudinally-spaced clamp assemblies including a first clamp assembly 72 and a second clamp assembly 74. Each clamp assembly 72, 74 includes a pair of laterally-spaced gripping members 76 mounted to the frame 35 for selective lateral movement between a locked position, whereat said gripping members 76 are disposed relatively closer to one another in a position suitable to grip about the sides 28 of the forward end 24 of said trailer 22 when at the towing position, thereby to lock the frame 35 as against rotation relative to the trailer 22 about the kingpin 30, and an unlocked position, whereat the gripping members 76 are disposed relatively further apart from one another in a position suitable to receive therebetween in spaced relation the forward end 24 of the trailer 22 during movement from the parked position to the towing position.

Figure 26:
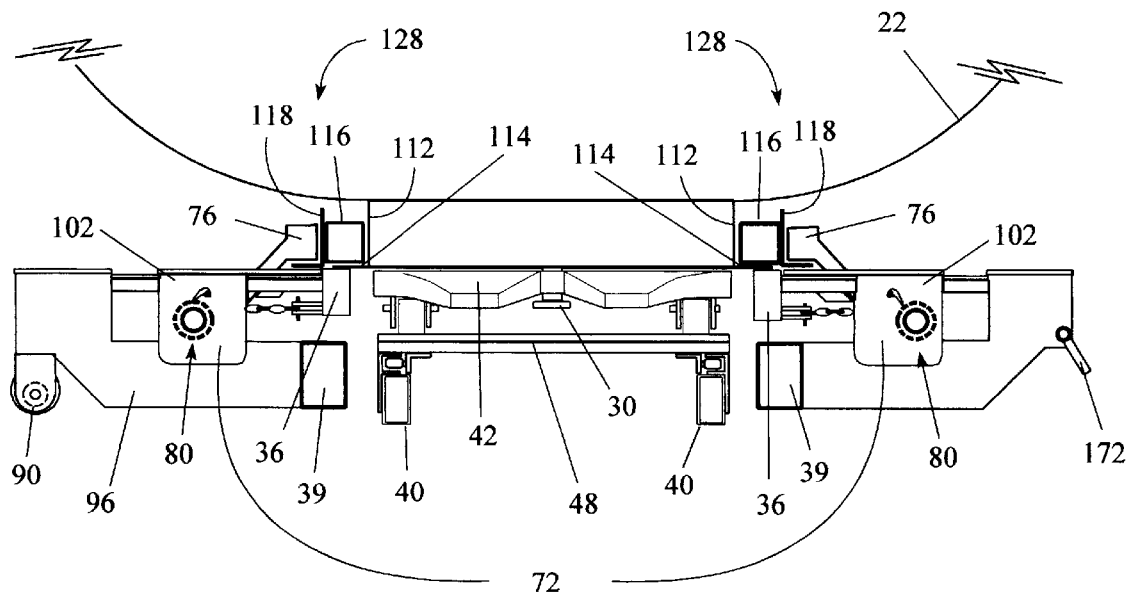
FIG. 26 is a cross-sectional view along line 26—26 of FIG. 25.

As indicated in FIG. 26, a pair of chain winches 80, connected between and to the frame 35 and respective gripping members 76 has been found useful to selectively urge the gripping members 76 of the first clamp 72 assembly towards the locked position, and to retain same thereat. However, while such winches 80 are also usefully provided in the case of the second clamp assembly 74, for the purpose of retaining the gripping members 76 at the locked position, it is preferable to provide for selective, reversible, linked, lateral movement of the gripping members 76 of the second clamp assembly 74, so as to provide for alignment of the frame 35 with the sides 28 of the trailer 22 during movement between the unlocked and the locked positions. As such, and as indicated in FIG. 25, the second clamp assembly 74 comprises a main lever arm 82, pivotally connected to the frame 35, particularly, to beam 96, and a pair of actuator arms 84, each actuator arm 84 being pivotally connected at its ends to the main lever arm 82 and to a respective one of the gripping members 76 of the second clamp assembly 74 such that movement of the main lever arm 82 causes said reversible, linked, lateral movement of the gripping members 76 at equal rates. A pneumatic cylinder 86 connects the frame 35, particularly, lower beams 39, to the main lever arm 82 and is retractably extendable from a retracted to an extended position for movement of the main lever arm 82, thereby to move the gripping members 76 of the second clamp assembly 74 between the unlocked and locked positions.

Figure 20:
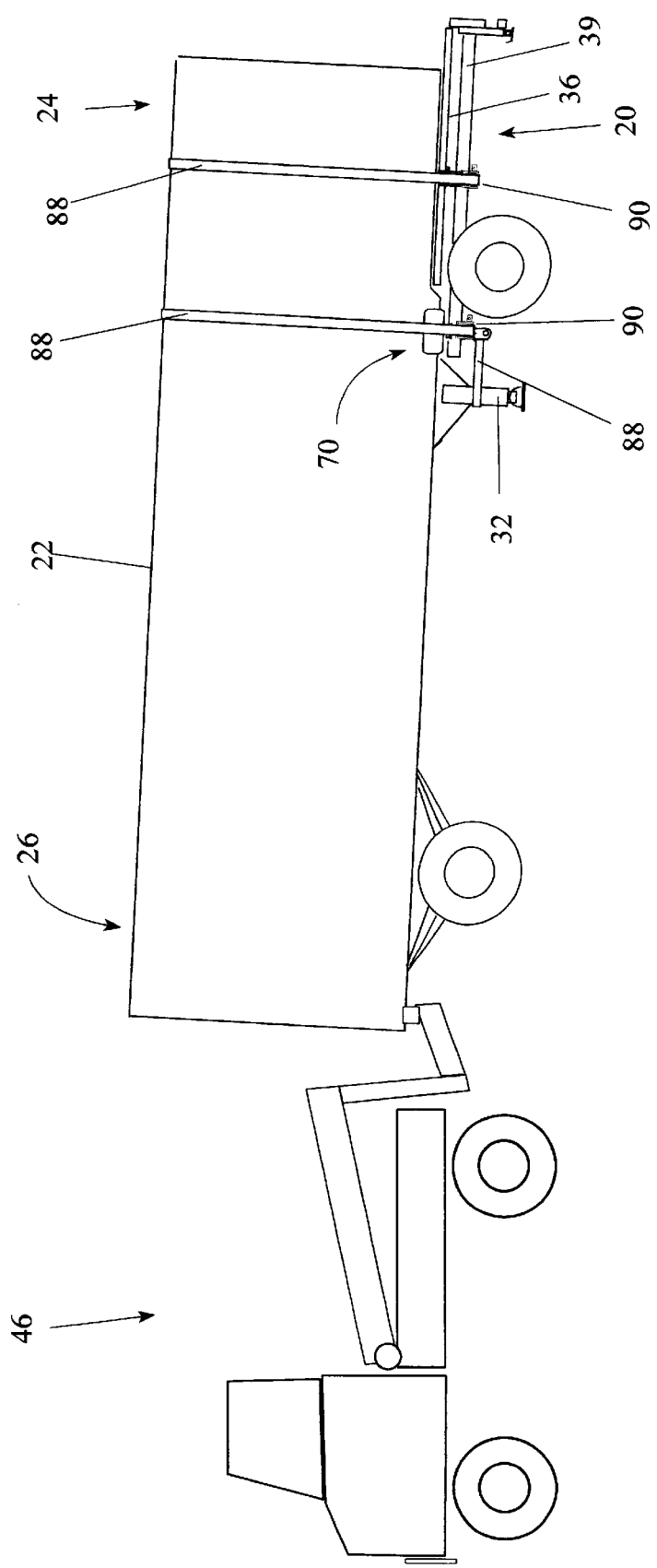
FIG. 20 is a side elevational view similar to FIG. 1, showing a tow truck in receipt of the trailer and dolly.
Figure 32:
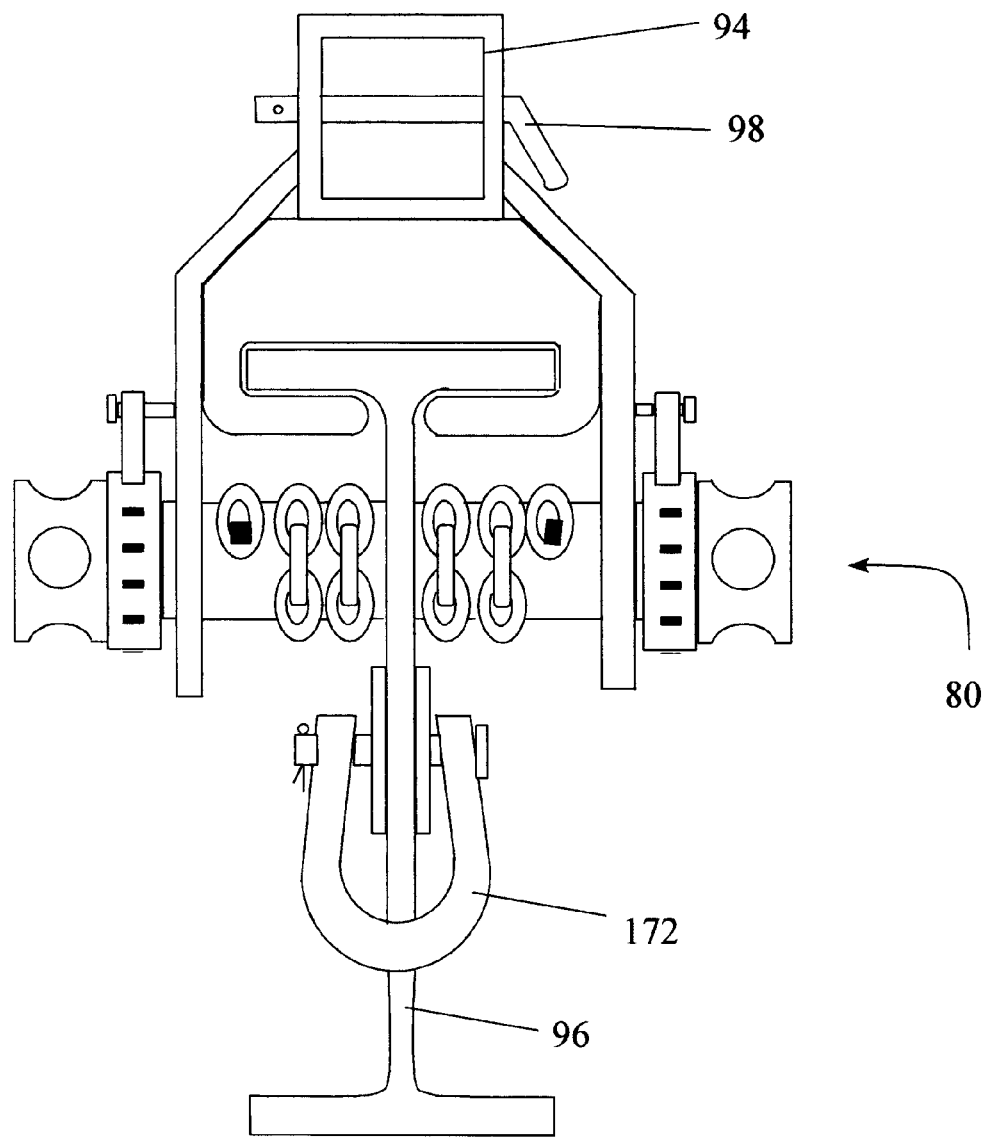
FIG. 32 is a detail side view along arrow H of FIG. 2 showing features of a second clamp portion and a strap winch portion of the dolly of FIG. 1.
Figure 33:
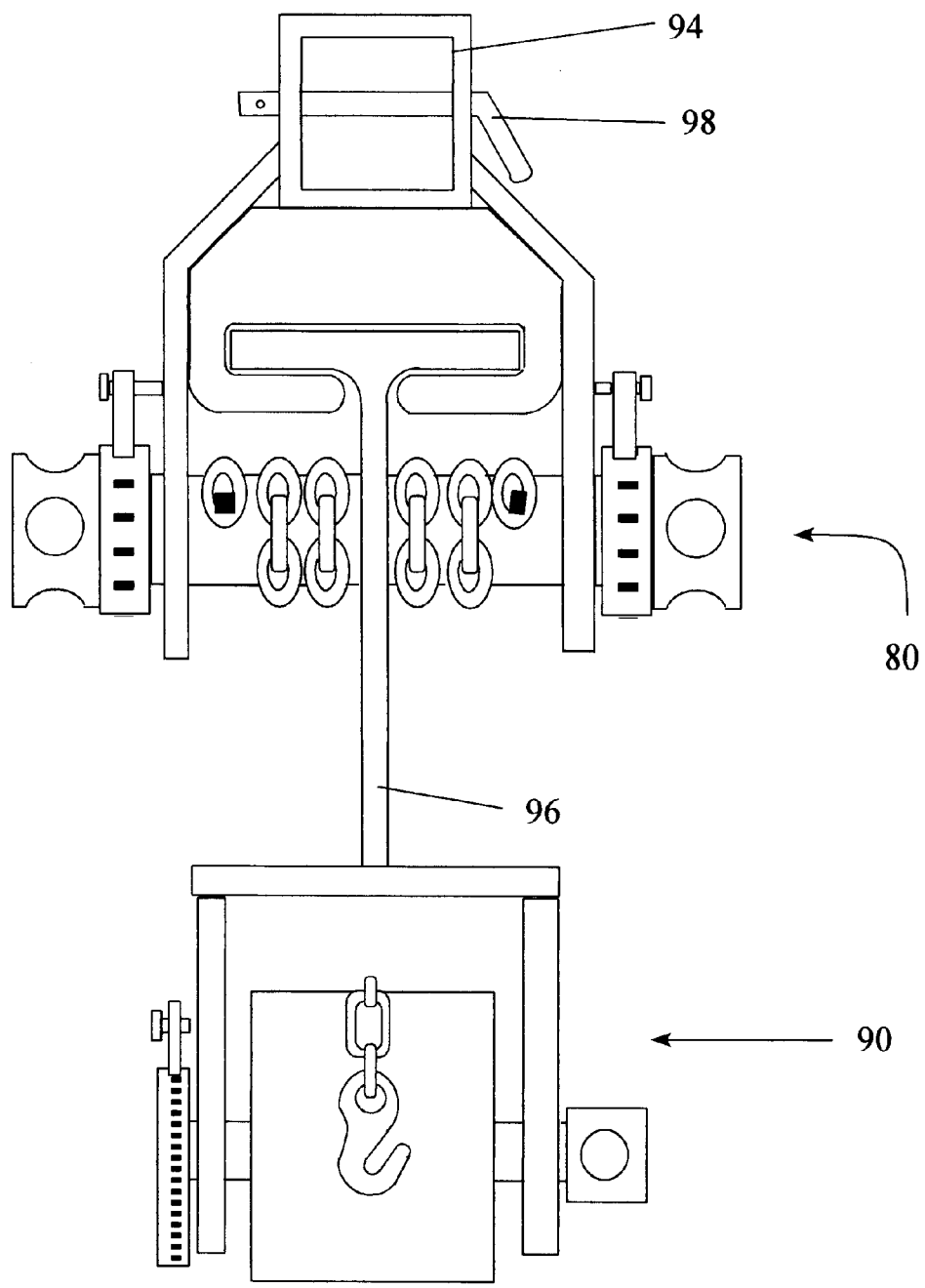
FIG. 33 is a detail side view along arrow G of FIG. 2 showing features of a second clamp portion and mounting lug portion of the dolly of FIG. 1.

As indicated by FIG. 20, once the frame 35 is locked to the trailer 22 by the clamping system 70, the trailer 22 can be moved by securing a tow truck 46 to the rearward end 26 of the trailer 22 and lifting the rearward end 26 of the trailer 22 up until only the tow truck and the dolly 20 support the trailer 22. The trailer 22 can then be towed without any reliance on the trailer's own wheels or suspension system. As the forward end 24 of the trailer is supported by the frame 35 at the towing position, the weight of the trailer 22 serves to limit the likelihood of dislodgment. However, in order to further secure the trailer 22 to the dolly 20, straps or chains 88 are preferably thrown over the top of the trailer 22 and secured to strap winches 90 and mounting lugs 172 located on opposite sides of the frame 35, as best illustrated in FIGS. 32 and 33. Straps 88 are also passed around jackstands 32, as indicated in FIG. 20, to further secure the dolly 20 longitudinally.

Figure 3:
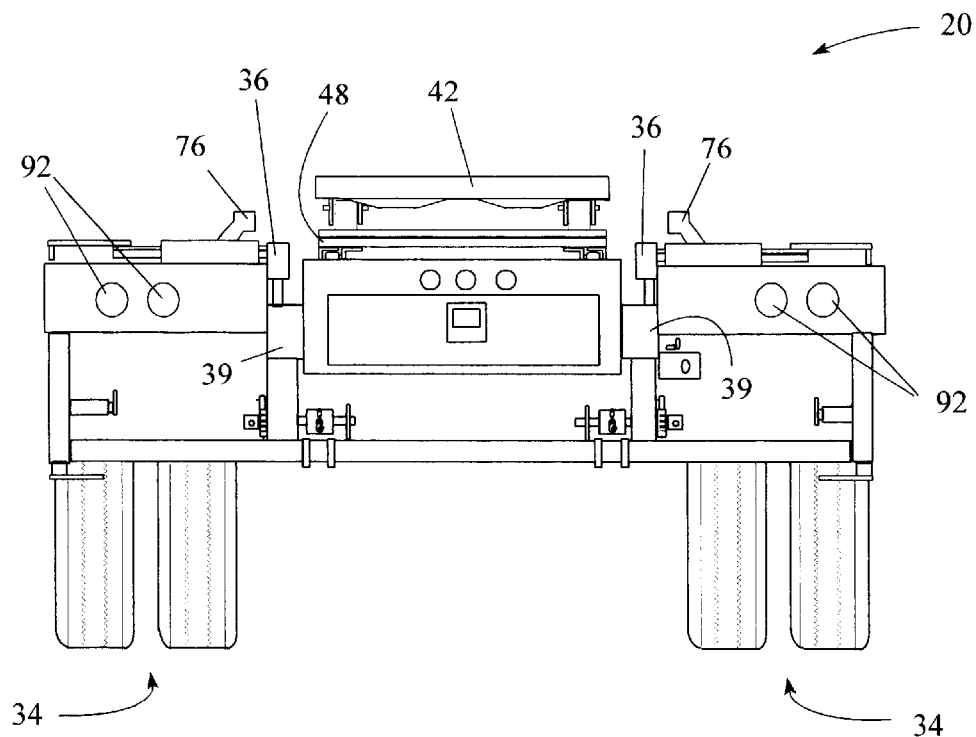
FIG. 3 is a rear view of the dolly of FIG. 1.
Figure 4:
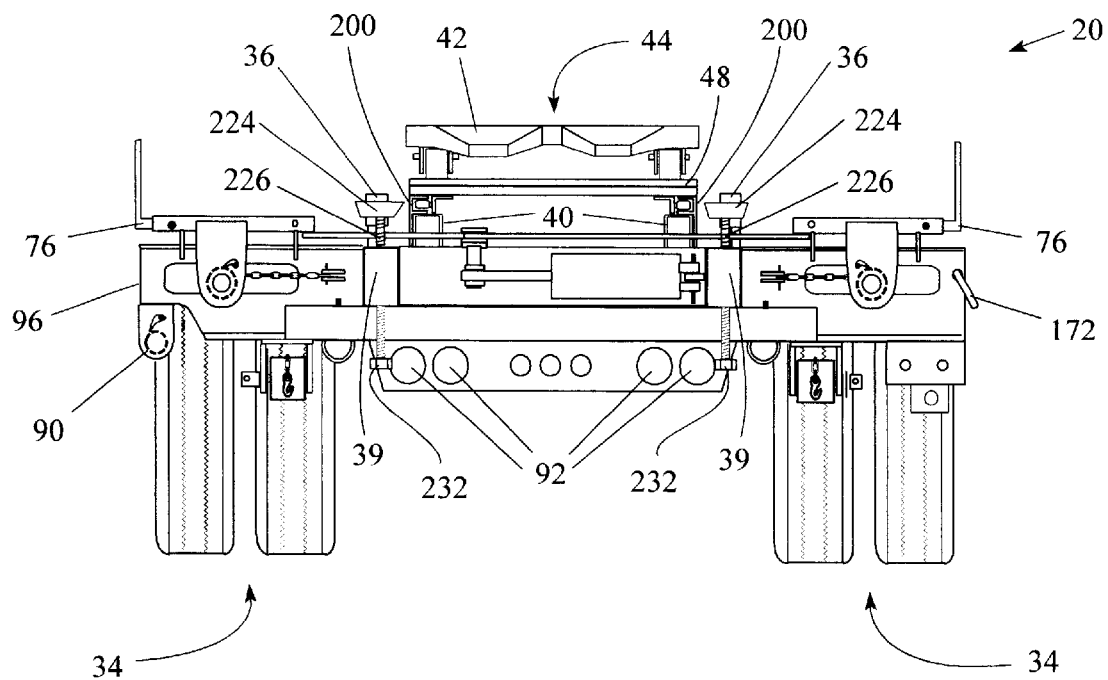
FIG. 4 is a front view of the dolly of FIG. 1.

As best illustrated in FIG. 4, signal and brake lights 92 are included on the dolly 20 so as to be viewable from the rear during towing, and conventional air brakes (not shown) are connected to the wheels 34 of the dolly 20, which can be controlled from the tow truck 46, so as to further improve safety when towing a disabled trailer. As illustrated in FIG. 5, for the purpose of transporting the dolly 20 (apart from a disabled trailer) a towing hitch 126 is provided, and lights 92 are provided so as to present rearwardly when the dolly 20 is being towed. As it is preferable for the dolly 20 to be manouevered into position by the vehicle which towed it, such lights will therefore be on the front and rear of the dolly 20, as illustrated in FIGS. 4 and 3, respectively.

Figure 16:
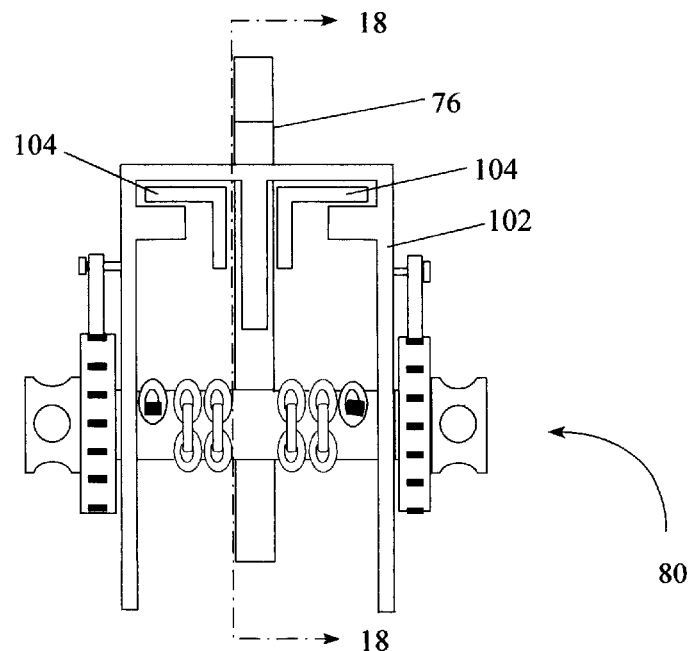
FIG. 16 is a side view showing features of the construction of a first clamp assembly portion of the dolly of FIG. 1.
Figure 17:
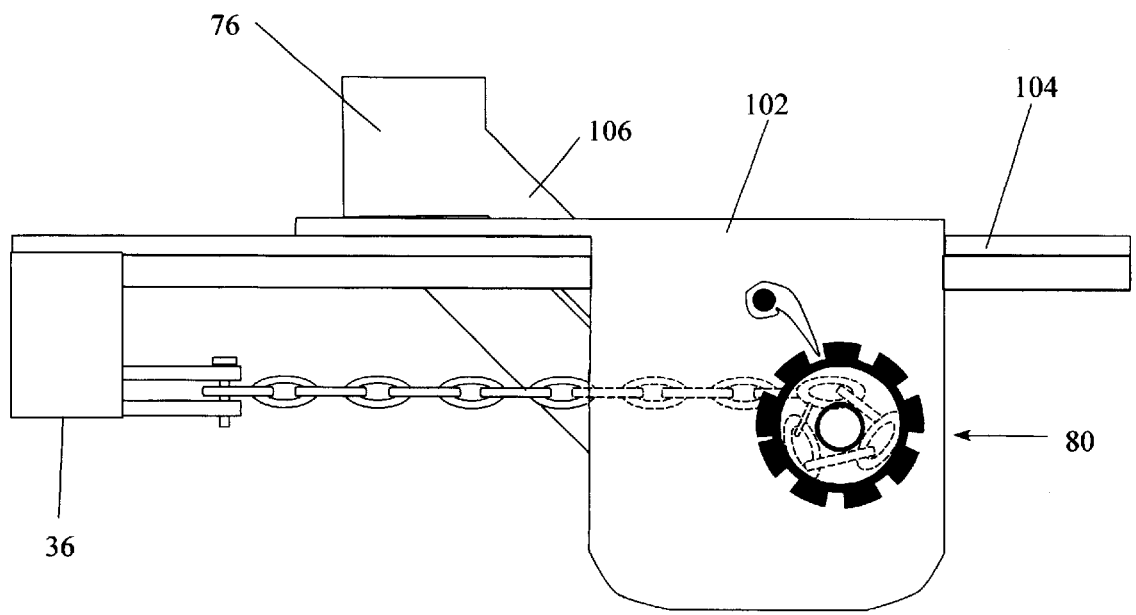
FIG. 17 is a front view of the structure of FIG. 16.
Figure 18:
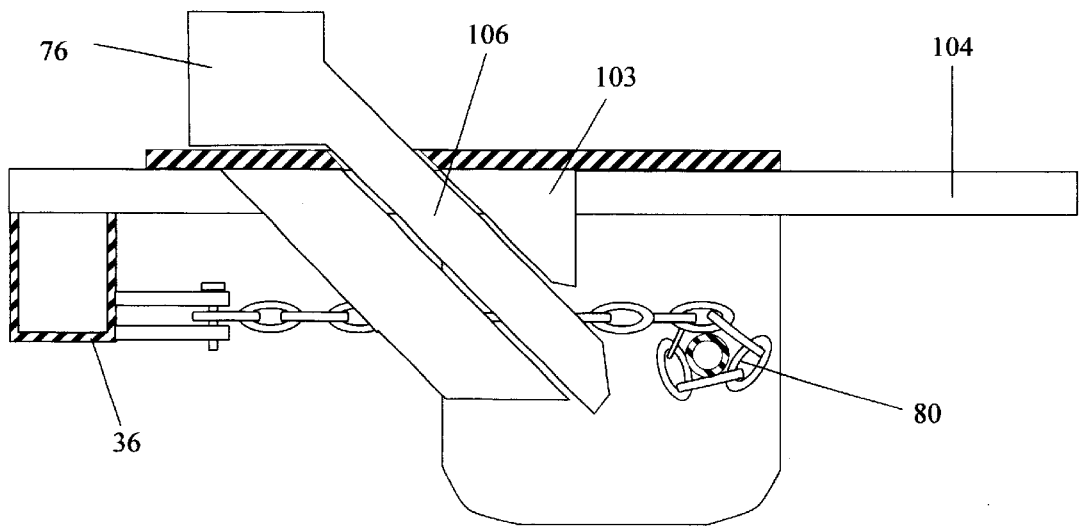
FIG. 18 is a cross-sectional view along line 18—18 of FIG. 16.
Figure 19:
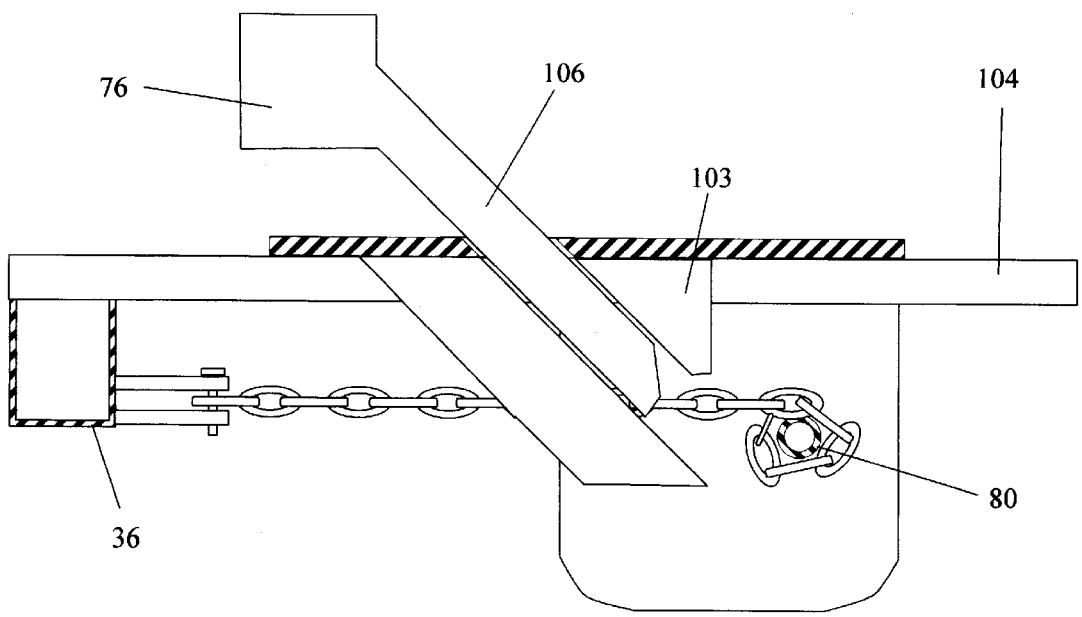
FIG. 19 is a cross-sectional view similar to FIG. 18, showing an integral shaft portion of the structure of FIG. 17 about to be inserted into a saddle portion of the structure of FIG. 17.
Figure 24:
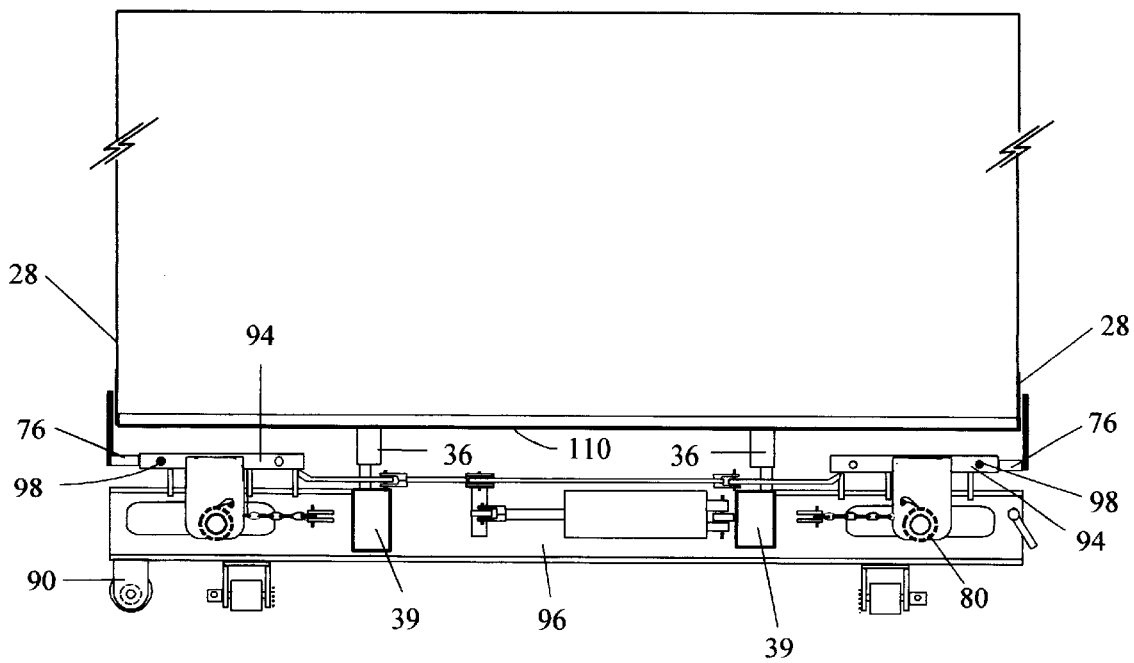
FIG. 24 is a front view of the structure of FIG. 23.

So as to enable the dolly to be utilized with trailers of various types, such as frameless dump trailers, tank trailers, frame trailers and van trailers, a variety of especially-adapted gripping members can be provided, which are releasably mounted to the frame 35 for selective movement as aforesaid. As illustrated in FIGS. 32–33 and FIGS. 21–22, in the case of the second clamping assembly 74, such releasable mounting is effected by the provision of open-ended sleeves 94 which ride along a transversely extending beam 96 which forms part of frame 35. The gripping member 76 can be telescopically received within the sleeve 94 and secured in place by one or more securing pins 98 which are inserted through aligned holes 100 provided along the sides of the sleeve 94 and the gripping member 76. The sleeves 94 are open at both ends so that they can be used with inwardly-extending gripping members 76, as illustrated in FIG. 22, and with outwardly extending gripping members 76, as illustrated in FIG. 24. As illustrated in FIG. 16 and FIG. 17, in the case of the first clamping assembly 72, such releasable mounting is effected by the provision of a saddle 102 adapted to ride along a transversely extending twin beam 104 formed of angle iron, the saddle 102 being adapted to receive a gripping member 76 having an integral shaft portion 106. The saddle 102 has an integral wedge portion 103, which bears downwardly against the shaft portion 106 upon movement to the locked position, as illustrated in FIGS. 18–19.

Ideally, the gripping members 76 are transported with the dolly 20 so that it can be adapted for use with a particular trailer quickly, easily and at the location of the trailer, with little or no advance planning. For greater clarity, use of the invention in association with frameless dump trailers, tank trailers, frame trailers and van trailers is described in the following paragraphs.

Figure 21:
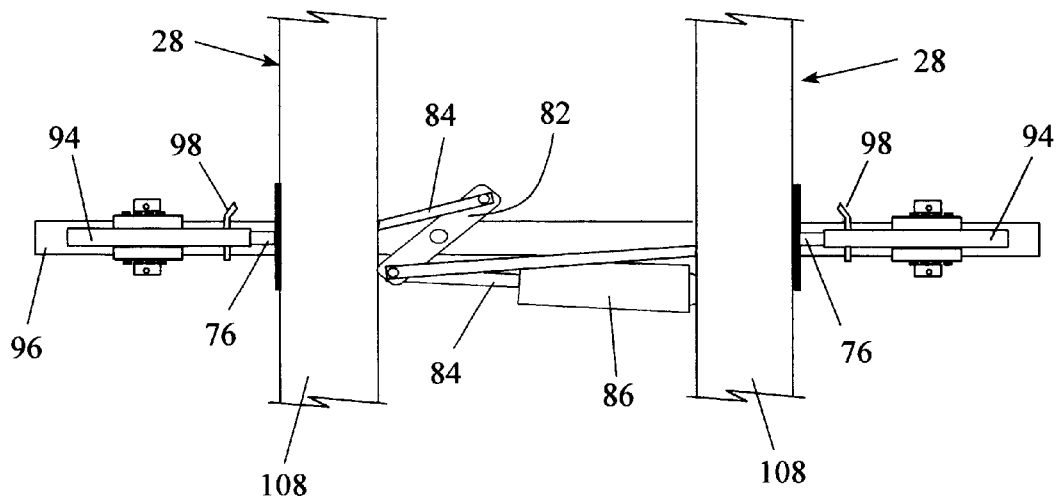
FIG. 21 is a top view of the dolly of FIG. 1 illustrating a second clamp assembly portion of the dolly in receipt of the frame of a frame trailer.
Figure 22:
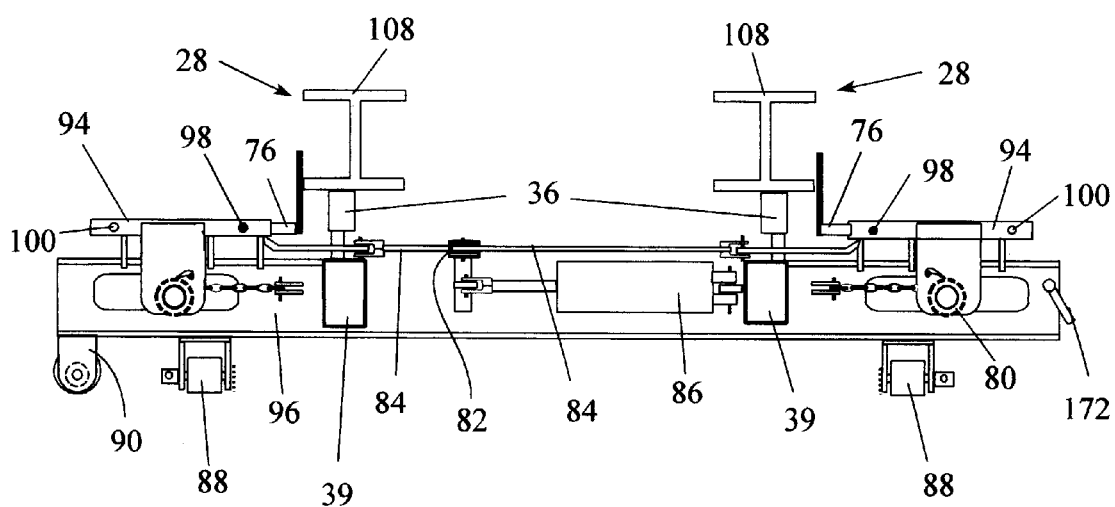
FIG. 22 is a front view of the structure of FIG. 21.

FIGS. 21 and 22 are illustrative of the manner in which the invention may be utilized in connection with a frame trailer. As indicated in the figures, frame trailers are characterized by an undercarriage having a pair of I-beam supports 108 running their length. In use, the frame trailer is lowered to the towing position such that the I-beam supports 108 rest upon the frame 35, particularly, on upper beams 36 and the gripping members 76 of the second clamp assembly 74 are positioned so as-to extend inwardly, and to laterally grip the sides 28 of the trailer 22, in this case, the sides of the I-beam supports 108, when moved to the locked position, as shown.

Figure 23:
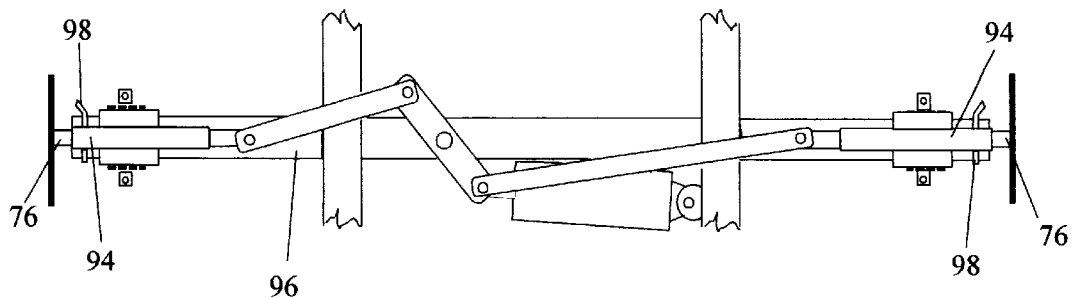
FIG. 23 is a detail top view similar to FIG. 21, showing the second clamp assembly ready for receipt of a van trailer.

FIGS. 23 and 24 are illustrative of the manner in which the invention is utilized in connection with a van trailer. As indicated, van trailers are essentially cubic in shape, with a planar bottom surface 110 extending between the vertical longitudinal sides 28 of the trailer 22. In use, the van trailer is lowered to the towing position, such that the flat bottom surface 110 rests upon the frame 35, particularly on upper beams 36, and the gripping members 76 of the second clamp assembly 74 are positioned so as to extend outwardly, and to laterally grip the vertical sides 28 of the trailer 22 when moved to the locked position, as shown.

Figure 31:
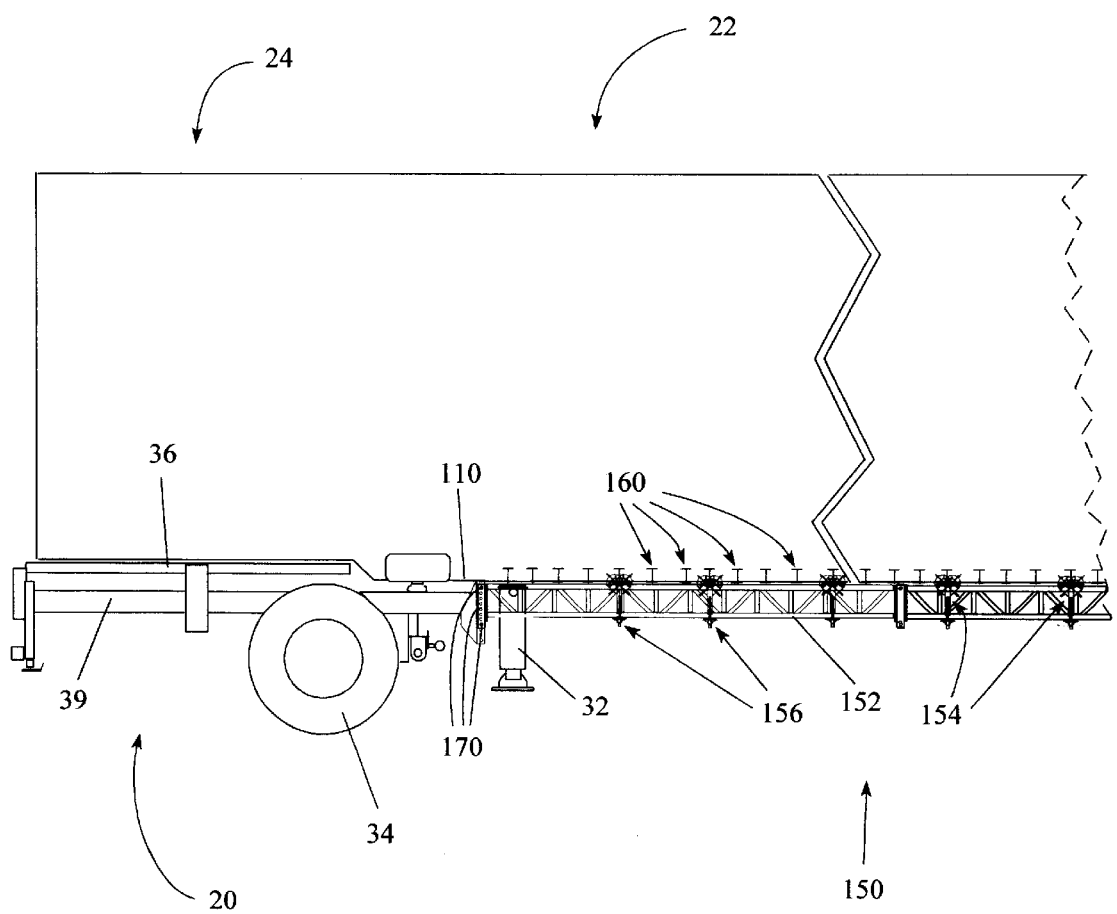
FIG. 31 is a side view similar to FIG. 8, showing a brace assembly rigidly connected to the dolly and supporting the undercarriage of the van trailer.

FIG. 31 illustrates the dolly 20 of the present invention in use with a bracing system 150 and in use with a disabled van trailer 22 wherein the bottom surface 110 is defined by a plurality of laterally-extending I beam cross-members 160 spaced-apart from one another in substantially side-by-side parallel relation. The bracing system 150 comprises a brace member 152 disposed beneath the undercarriage; arranged substantially transversely to the cross-members 160; and rigidly connected, by bolts 170, to the dolly 20. The system 150 also comprises a plurality of cross-member clamping assemblies 154. Each clamping assembly 154 is selectively, releasably connected to a respective cross-member 160. Additionally, a connection mechanism 156 selectively, releasably connecting the brace member 152 to each clamping assembly 154 is provided, to support the undercarriage as against sagging, for subsequent towing.

Figure 27:
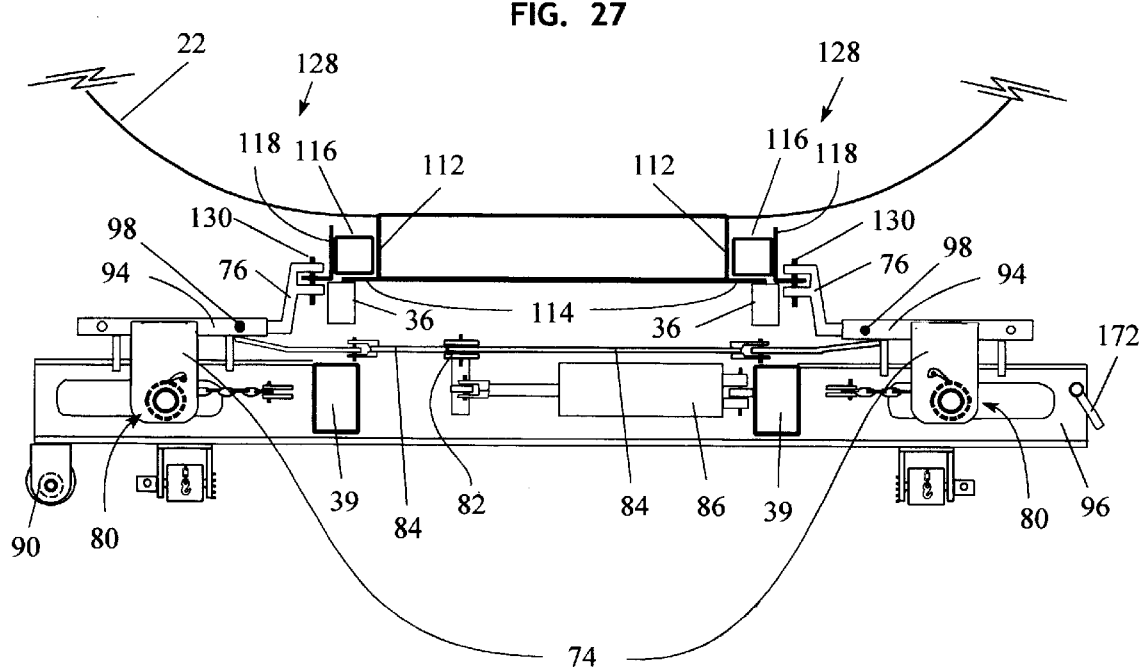
FIG. 27 is a sectional view along line 27—27 of FIG. 25.

FIGS. 25, 26 and 27 are illustrative of the manner in which the invention may be utilized in connection with tank trailers, which are characterized by an undercarriage including a box-like structure extending a portion of the length of the undercarriage, having a pair of vertical wall portions 112 extending lengthwise and each having a flange portion 114 extending laterally outwardly from the base of the wall portion 112. In such use, a pair of tank trailer clamping bars 128 is provided. Each tank trailer clamping bar 128 is adapted to bear against a respective vertical wall portion 112; is adapted to be gripped by a respective gripping member 76 of the first clamp assembly 72; and is adapted for pivotal connection to a respective gripping member 76 of the second clamp assembly 74. As illustrated, each tank trailer clamping bar 128 includes a spacing member 116 formed of square tube; and a grippable member 118 formed of angle iron and rigidly connected, by bolting or the like, to the spacing member 116.

In use, the tank trailer is lowered to the towing position such that the flange portions 114 rest upon upper beams 36. Thereafter, the spacing members 116 are each arranged on top of a respective flange portion 114. Then, the grippable members 118 are each pivotally connected, by a pin 130, to a respective gripping member 76 of the second clamp assembly 74, and the gripping members 76 of the first clamp assembly 72 are inserted into the saddles 102 such that the grippable members 118 are disposed between the gripping members 76 and the frame 35, particularly, the beam 96 (as shown in FIG. 26). Once so positioned, the first clamp assembly 72 and second clamp assembly 74 are moved to the locked position, such that the grippable members 118 are grasped between respective gripping members 76 of the first clamp assembly 72 and the frame 35, by virtue of wedging forces exerted by the integral wedge portions 103 of the saddles 102 on the shaft portions 106 of the gripping member 76, and such that the trailer clamping bars 128 are drawn together to bear against the vertical wall portions 112 and clamp the trailer.

Figure 28:
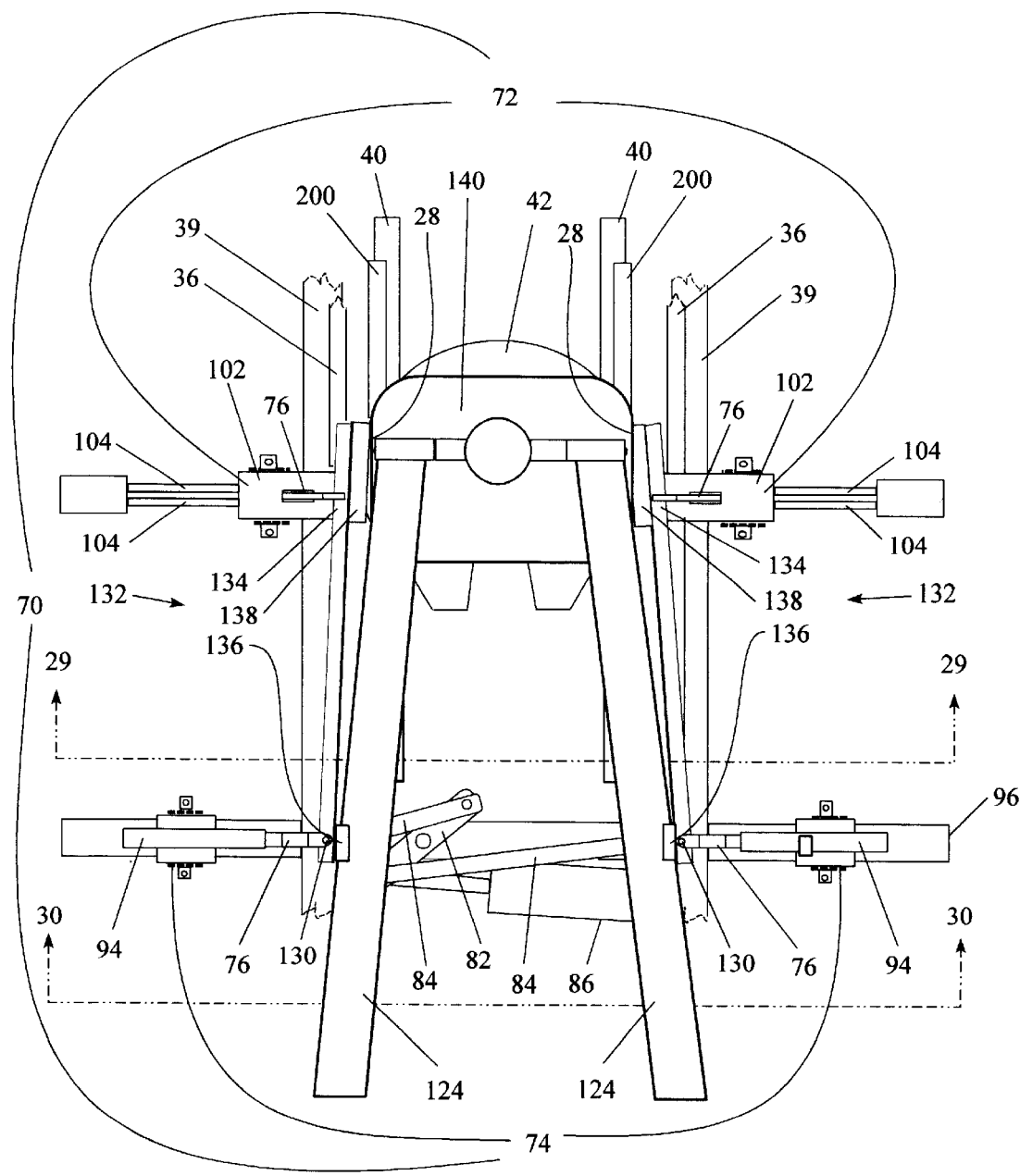
FIG. 28 is a top view similar to FIG. 21, showing the first clamp assembly and second clamp assembly in receipt of the undercarriage of a frameless dump trailer.
Figure 29:
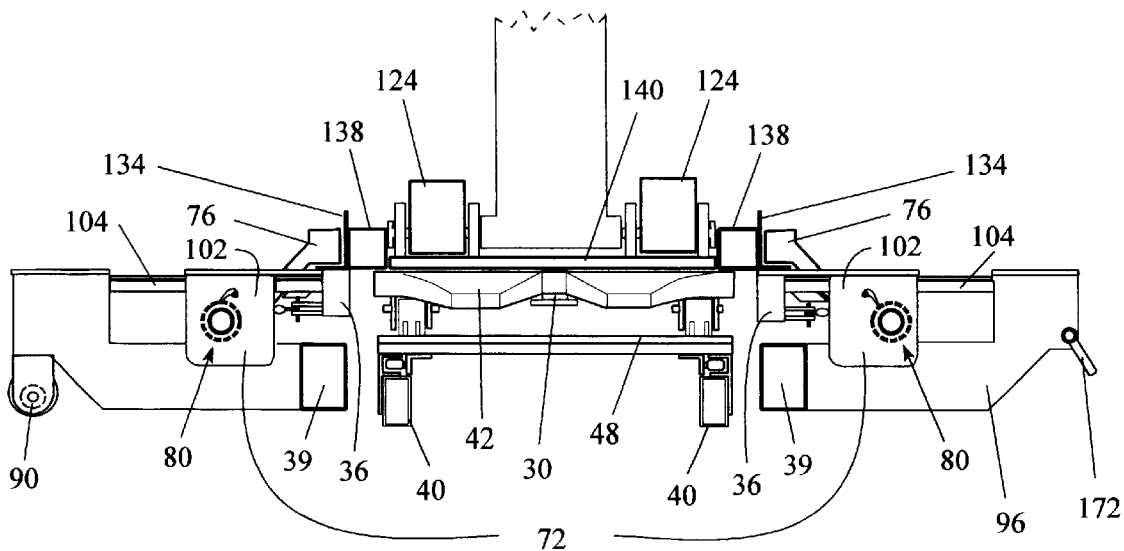
FIG. 29 is a cross-sectional view along line 29—29 of FIG. 28.
Figure 30:
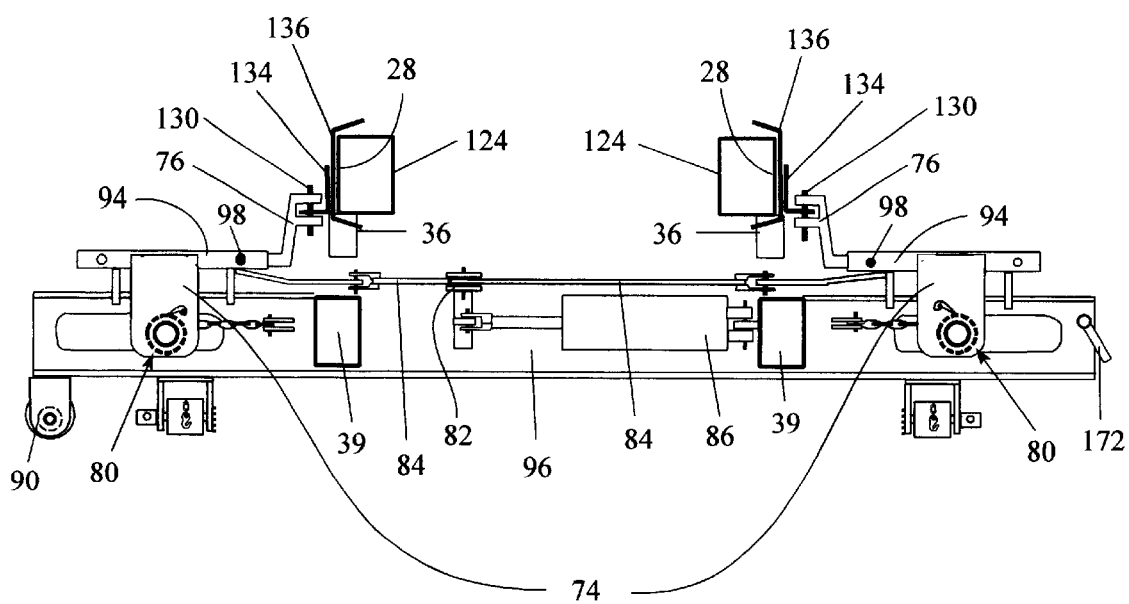
FIG. 30 is a cross-sectional view along line 30—30 of FIG. 28.

FIGS. 28, 29 and 30 are illustrative of the manner in which the invention may be utilized in connection with frameless dump trailers, which are characterized by an undercarriage including a upper plate 140 from which the kingpin 30 depends, and which itself is hung from a pair of beams 124 that extend therefrom substantially the length of the trailer, tapering outwardly through such extension. In such use, a pair of frameless dump clamping bars 132 are provided. Each frameless dump clamping bar 132 is adapted to bear, at opposite ends, against the upper plate 140 and a respective beam 124; is adapted to be gripped by a respective gripping member 76 of the first clamp assembly 72; and is adapted for pivotal connection to a respective gripping member 76 of the second clamp assembly 74. As illustrated, each frameless dump clamping bar 132 includes a main body member 134 formed of angle iron; a bracket member 136 formed of channel iron; and a pad member 138 formed of square tube, the bracket member 136 and pad member 138 being rigidly connected, by bolting or the like, to opposite ends of the main body member 134.

In use, the frameless dump trailer is lowered to the towing position, such that the beams 124 thereof rest upon the frame 35, particularly, upper beams 36, as illustrated in FIG. 30. Thereafter, each main body member 134 is pivotally connected, at the end thereof to which the bracket member 136 is connected, to a respective gripping member 76 of the second clamp assembly 74. As illustrated, such pivotal connection is effected by a pin 130. As well, the gripping members 76 of the first clamp assembly 72 are inserted into the saddles 102 such that the main body member 134, at the end thereof to which the pad member 138 is connected, is disposed between the gripping members 76 and the upper beams 36, as indicated in FIG. 29. Once so positioned, the first clamp assembly 72 and second clamp assembly 74 are moved to the locked position, such that the main body members 134 are grasped between respective gripping members 76 of the first clamp assembly 72 and the frame 35, by virtue of wedging forces exerted by the integral wedge portions 103 of the saddles 102 on the shafts 106 of said gripping members 76, and such that the frameless dump trailer clamping bars 132 are drawn together and brought to bear, at opposite ends, against the upper plate 140 and a respective beam 124, to lock the trailer. It will be evident that, when the dolly 20 of the present invention is used in conjunction with frameless dump trailers, the frame 35 alone does not support the forward end 24 of the trailer 22. Rather, the forward end 24 of the trailer 22 is supported by the frame 35 and by the fifth wheel 42, at the lowered position, and it is contemplated that this is encompassed within the present invention. So as to improve stability in this use, it is advantageous to engage the lockdown pin 174 previously described, so as to lock the fifth wheel 42 at the lowered position.

As will be evident from the foregoing, the undercarriages of the various trailers with which the invention may be utilized may take a variety of forms. Accordingly, in the preferred embodiment, a pair of adjustable rear supports 222 is provided, as illustrated in FIG. 1. The support 222 includes a contact member 224 and a pair of upstanding jack screws 226. A spherical end 228 is formed at the end of each jack screw 226, which is journalled in a corresponding socket 230 formed in the contact member 224, as indicated in FIG. 1, wherein a portion of the contact member 224 is shown in cross-section to reveal the socket 230 and spherical end 228. The jack screws 226 are each threaded into corresponding holes (not shown) provided in the lower beams 39, and are provided with a hex head 232, for manipulation. As best indicated in FIGS. 9–12, this structure enables the contact member 224 to be raised into contact against the undercarriage of the trailer with which the invention is being utilized, to carry some of the load, and improve overall stability.

It will also be understood that the descriptions provided in relation to the manner of use of the dolly in association with trailers of various types are exemplary only, and that the dolly can be utilized in other manners with utility, and indeed, various changes in size, shape and arrangement of parts can be made in respect of the dolly itself without departing from the spirit or scope of the invention.

For example, only, whereas the illustrations of the preferred embodiment depict a single axle dolly, with dual wheels, it will be evident that single or triple wheels could be utilized, as could two or more axles.

As well, whereas the illustrations of the preferred embodiment depict a sliding fifth wheel assembly, this functionality need not be incorporated, nor it is necessary that the orientation of the translation axis remain constant relative to the ground during movement between the raised and lowered positions.

Similarly, whereas actuation of movement of the fifth wheel assembly and main lever arm is described herein as being effected by pneumatic means (air bags and a pneumatic cylinder, respectively), other motive devices, such as hydraulic rams, could be utilized with equal utility. Indeed, it is contemplated that the second clamp assembly itself, which includes the main lever arm in the preferred embodiment, or the first clamp assembly, may be omitted. Also, whereas a towing hitch is described as being useful for the purpose of transporting the dolly, it may readily be omitted, and towed using other implements on a standard tow truck. Accordingly, it is to be understood that the scope of the present invention is limited only by the claims appended hereto, purposively construed.

What is claimed is:

1. A dolly for use with a truck trailer having a forward end, a rearward end, a pair of spaced-apart sides each extending between the forward end and the rearward end and a kingpin depending downwardly from the underside of the forward end, said dolly comprising:

a pair of ground-engaging wheels defining a rotation axis;

a frame mounted to the wheels and movable during use of the dolly to an engagement position beneath said forward end of said trailer, the frame defining a longitudinal axis perpendicular to said rotation axis;

a fifth wheel assembly including a track defining a translation axis that is substantially parallel to said longitudinal axis and further including a fifth wheel for connection with the kingpin of said trailer and mounted to the track for selective movement parallel to said translation axis;

a mounting assembly connecting the fifth wheel assembly to the frame for selective, reversible movement from a raised position, whereat the fifth wheel is positioned so as to receive the kingpin of said trailer upon movement of the frame to the engagement position and to support said forward end of the trailer, to a lowered position, during which movement the forward end of the trailer is lowered to a towing position, whereat said forward end is supported on the frame for rolling movement therewith; and a clamp system mounted to the frame for selectively, releasably locking the frame, when the forward end of the trailer is at the towing position, as against rotation relative to the trailer about the kingpin, so as to permit the trailer to be towed from the rearward end thereof.

2. A dolly according to claim 1, wherein the mounting assembly includes four links forming two pairs of longitudinally-spaced mounting links, the same four links also forming a first pair and a second pair that are laterally spaced apart, each mounting link extending between and being pivotally connected to each of the track and the frame such that the first pair, the frame and the track together define a first 4-bar parallelogram linkage and the second pair, the frame and the track together define a second 4-bar parallelogram linkage.

3. A dolly according to claim 2, wherein the mounting assembly further comprises two lateral equalizer bars, each extending from a respective mounting link of the first pair to a respective one of the mounting links of the second pair and connected thereto.

4. A dolly according to claim 3, wherein the mounting assembly further comprises a longitudinal equalizer bar extending between said lateral equalizer bars and rigidly connected thereto.

5. A dolly according to claim 1, wherein said mounting assembly includes an air bag assembly mounted between and to the frame and the track, for selectively effecting movement of the fifth wheel assembly between the raised position and the lowered position.

6. A dolly according to claim 1, wherein the clamp system comprises a pair of longitudinally-spaced clamp assemblies including a first clamp assembly and a second clamp assembly, each clamp assembly including a pair of laterally-spaced gripping members mounted to said frame for selective lateral movement between a locked position, whereat said gripping members are disposed relatively closer to one another in a position suitable to grip the forward end of said trailer when at the towing position, thereby to lock the frame as against rotation relative to the trailer about the kingpin, and an unlocked position, whereat said gripping members are disposed further apart from one another in a position suitable to receive therebetween in spaced relation the forward end of the trailer.

7. A dolly according to claim 6, wherein the gripping members of the second clamp assembly are mounted to the frame for selective, reversible, linked, lateral movement towards one another at equal rates, thereby to align the frame with the sides of the trailer during movement between the unlocked and the locked position.

8. A dolly according to claim 1, wherein the clamp system comprises a clamp assembly including a pair of laterally-spaced gripping members positionable in an unlocked position, whereat said gripping members are disposed relatively distal to one another in a position suitable to receive therebetween in spaced relation the forward end of the trailer during movement to the towing position, and mounted to said frame for selective, reversible, linked, lateral movement towards one another at equal rates to a locked position whereat said gripping members are disposed closer to one another in a position suitable to grip the forward end of said trailer when at the towing position, thereby to lock the frame as against rotation relative to the trailer about the kingpin.

9. A dolly for use with a truck trailer having a forward end, a rearward end, a pair of spaced-apart sides each extending between the forward end and the rearward end and a kingpin depending downwardy from the underside of the forward end, said dolly comprising:

a pair of ground-engaging wheels defining a rotation axis and a frame mounted to the wheels, said frame being movable during use of said dolly to an engagement position beneath the forward end of said trailer, the frame defining a longitudinal axis that is perpendicular to the rotation axis;

a fifth wheel assembly including a fifth wheel for connection with the kingpin of said trailer and mounted to the frame for selective, reversible movement from a raised position, whereat the fifth wheel is positioned so as to receive the kingpin of said trailer upon movement of the frame to the engagement position and to support the forward end of the trailer, to a lowered position, during which movement the forward end of the trailer is lowered to a towing position, whereat said forward end is supported on the frame for rolling movement therewith; and a clamp system including a pair of longitudinally-spaced clamp assemblies including a first clamp assembly and a second clamp assembly, each clamp assembly including a pair of laterally-spaced gripping members mounted to said frame for selective lateral movement between a locked position, whereat said gripping members are disposed relatively closer to one another in a position suitable to grip the forward end of said trailer when at the towing position, thereby to lock the frame as against rotation relative to the trailer about the kingpin and permit the trailer to be towed from the rearward end thereof, and an unlocked position, whereat said gripping members are disposed relatively further apart from one another in a position suitable to receive therebetween in spaced relation the forward end of the trailer.

10. A dolly according to claim 9, wherein the first clamp assembly comprises a pair of winches connected between and to the frame and respective gripping members of the first clamp assembly to selectively urge this pair of gripping members towards and retain same at the locked position.

11. A dolly according to claim 9, wherein the gripping members of the second clamp assembly are mounted to the frame for selective, reversible, linked, lateral movement towards one another at equal rates, thereby to align the frame with the sides of the trailer during movement between the unlocked and the locked position.

12. A dolly according to claim 11, wherein the second clamp assembly comprises a main lever arm pivotally connected to the frame and a pair of actuator arms, each actuator arm being pivotally connected at its ends to said main lever arm, and to a respective one of the gripping members of the second clamp assembly such that movement of the main lever arm causes said reversible, linked, lateral movement of the gripping members at equal rates.

13. A dolly according to claim 12, wherein the second clamp assembly further comprises a pneumatic cylinder connecting the frame to the main lever arm and retractably extendable from a retracted position to an extended position, thereby to move the pair of gripping members of said second clamp assembly between the unlocked position and the locked position.

14. A dolly according to claim 13, wherein the second clamp assembly further comprises a pair of winches connected between and to the frame and respective gripping members of the second clamp assembly to selectively retain this pair of gripping members at the locked position.

15. A dolly for use with a truck trailer of the type having a forward end, a rearward end, a pair of spaced-apart sides extending between the forward end and the rearward end and a kingpin depending downwardy from the underside of the forward end, said dolly comprising:

a pair of ground-engaging wheels defining a rotation axis;

a frame mounted to the wheels and movable during use of the dolly to an engagement position beneath the forward end of said trailer, the frame defining a longitudinal axis perpendicular to the rotation axis;

a fifth wheel assembly including a fifth wheel for connection with the kingpin of said trailer and mounted to the frame for selective, reversible movement from a raised position, whereat the fifth wheel is positioned so as to receive the kingpin of said trailer upon movement of the frame to the engagement position and to support the forward end of the trailer, to a lowered position, during which movement of the track the forward end of the trailer is lowered to a towing position, whereat said forward end is supported on the frame for rolling movement therewith; and a clamp system including a clamp assembly having a pair of laterally-spaced gripping members positionable in an unlocked position, whereat said gripping members are disposed relatively further apart from one another in a position suitable to receive therebetween in spaced relation the forward end of the trailer, said gripping members being mounted to said frame for selective, reversible, linked, lateral movement therefrom towards one another at equal rates, thereby to align the frame with the sides of the trailer, to a locked position whereat said gripping members are disposed relatively closer to one another in a position suitable to grip the forward end of said trailer when at the towing position, thereby to lock the frame as against rotation relative to the trailer about the kingpin and permit the trailer to be towed from the rearward end thereof.

16. A dolly according to claim 15, wherein the clamp assembly comprises a main lever arm pivotally connected to the frame and a pair of actuator arms, each actuator arm being pivotally connected at its ends to the main lever arm and to a respective one of the gripping members such that movement of the main lever arm causes reversible, linked, lateral movement of the gripping members at equal rates.

17. A dolly according to claim 16, wherein the clamp assembly further includes a pneumatic cylinder connecting the frame to the main lever arm and retractably extendable from a retracted position to an extended position, thereby to move the pair of gripping members between the unlocked position and the locked position.

18. A dolly according to claim 17, wherein the clamp assembly further includes a pair of winches connected between and to the frame and respective gripping members of the clamp assembly to selectively retain said pair of gripping members at the locked position.

* * * * *